(12) United States Patent
Igarashi

(10) Patent No.: US 11,626,940 B2
(45) Date of Patent: Apr. 11, 2023

(54) RADIO RECEPTION APPARATUS, RADIO COMMUNICATION SYSTEM, AND RADIO RECEIVING METHOD

(71) Applicant: NEC Corporation, Tokyo (JP)

(72) Inventor: Aoi Igarashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 60 days.

(21) Appl. No.: 17/320,886

(22) Filed: May 14, 2021

(65) Prior Publication Data

US 2021/0367708 A1    Nov. 25, 2021

(30) Foreign Application Priority Data

May 20, 2020 (JP) .............................. JP2020-087867

(51) Int. Cl.
| | | |
|---|---|---|
| *H04L 1/00* | (2006.01) | |
| *H04W 28/04* | (2009.01) | |
| *H04L 47/28* | (2022.01) | |
| *H04L 47/62* | (2022.01) | |

(52) U.S. Cl.
CPC .......... *H04L 1/0045* (2013.01); *H04L 1/0061* (2013.01); *H04W 28/04* (2013.01); *H04L 47/28* (2013.01); *H04L 47/6215* (2013.01)

(58) Field of Classification Search
CPC ... H04L 1/0045; H04L 1/1887; H04L 1/0061; H04L 47/28; H04L 47/6215; H04W 28/04
See application file for complete search history.

(56) References Cited

U.S. PATENT DOCUMENTS

| | | | | |
|---|---|---|---|---|
| 8,751,881 B1* | 6/2014 | Terry | .................... | H04L 1/0044 714/708 |
| 2011/0261814 A1* | 10/2011 | Matthews | ............... | H04L 47/28 370/389 |
| 2014/0133295 A1* | 5/2014 | Frohna | .................... | H04L 47/12 370/235 |
| 2017/0187589 A1* | 6/2017 | Pope | .................... | H04L 1/0082 |

FOREIGN PATENT DOCUMENTS

| | | |
|---|---|---|
| JP | 2005-159792 A | 6/2005 |
| JP | 2014-049935 A | 3/2014 |

\* cited by examiner

*Primary Examiner* — Oussama Roudani

(57) ABSTRACT

A radio reception apparatus and the like capable of eliminating a pseudo reception error while minimizing a change in a frame format are provided. A radio reception apparatus 30 according to the present disclosure includes: a receiving unit 301 configured to receive a frame from a radio transmission apparatus 20; a determination unit 302 configured to determine, using the frame received from the radio transmission apparatus 20, whether or not transmission of a preceding frame that has been received from the radio transmission apparatus 20 before receiving of the frame has been interrupted; and an error processing unit 306 configured to eliminate a reception error regarding the preceding frame in accordance with a determination that the transmission of the preceding frame has been interrupted.

6 Claims, 16 Drawing Sheets

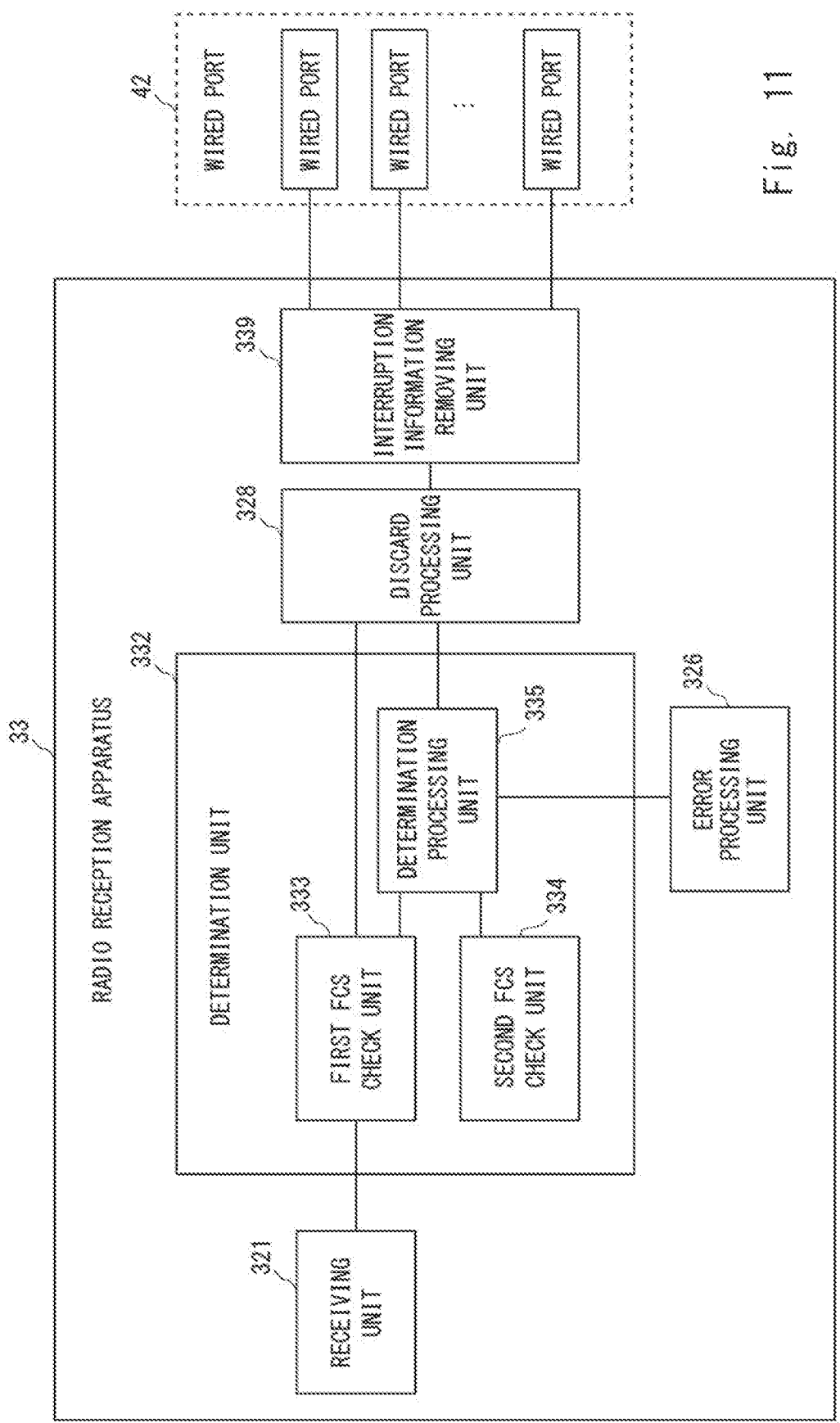

| CASE No. | FCS CHECK RESULTS | | PRESENCE OR ABSENCE OF INTERRUPTION INFORMATION | PROCESSING | | |
|---|---|---|---|---|---|---|
| | FIRST CHECK | SECOND CHECK | | ERROR FLAG | RECEPTION ERROR OF PREVIOUS FRAME | CONTENT OF PROCESSING ON CURRENT FRAME |
| 1 | NG | OK | PRESENT | 1→0 | MASK | REMOVE INTERRUPTION INFORMATION AND SEND |
| 2 | OK | NG | ABSENT | 0→0 or 1→0 | CONFIRM AND NOTIFY WITH ERROR FLAG 1→0 | DIRECTLY SEND |
| 3 | NG | NG | UNKNOWN | 0→1 or 1→1 | CONFIRM AND NOTIFY WITH ERROR FLAG 1→1 | DISCARD |
| 4 | OK | OK | UNKNOWN | – | – | – |

Fig. 12

RADIO RECEPTION APPARATUS, RADIO COMMUNICATION SYSTEM, AND RADIO RECEIVING METHOD

INCORPORATION BY REFERENCE

This application is based upon and claims the benefit of priority from Japanese patent application No. 2020-87867, filed on May 20, 2020, the disclosure of which is incorporated herein in its entirety by reference.

TECHNICAL FIELD

The present disclosure relates to a radio reception apparatus, a radio communication system, and a radio receiving method.

BACKGROUND ART

In mobile networks, frames (priority frames) where it is required to reduce a delay variation, like Precision Time Protocol (PTP), and other frames (non-priority frames) are used in a mixed manner. There is a problem that, when a priority frame has been input from a wired port while a radio transmission apparatus is transmitting a non-priority frame in a radio section, it is required to wait until completion of transmission of a non-priority frame with respect to reading out the priority frame, which causes a delay variation of the priority frame.

In order to solve the above problem, Japanese Unexamined Patent Application Publication No. 2014-049935 discloses a communication apparatus that stops reading of a non-priority packet when a priority packet has been detected from a priority queue during reading of the non-priority packet from the non-priority queue and preferentially reads out the priority packet.

Further, Japanese Unexamined Patent Application Publication No. 2005-159792 discloses a communication system for giving, when a priority frame has arrived during transmission of a non-priority frame stored in the non-priority buffer, a marking code to the end of the non-priority frame, and interrupting the transmission of the non-priority frame.

However, there is a problem, in the communication apparatus disclosed in Japanese Unexamined Patent Application Publication No. 2014-049935 described above, that the non-priority frame whose transmission has been intentionally interrupted is recognized as a broken frame on a receiving side and erroneously recorded as a reception error, which is a so-called pseudo error.

Further, while a Frame Check Sequence (FCS) is typically added to the end of a frame, there is a problem, in the communication system disclosed in Japanese Unexamined Patent Application Publication No. 2005-159792 described above, that there is a significant change in the frame format.

SUMMARY

The present disclosure has been made in view of the above problem and an object of the present disclosure is to provide a radio reception apparatus, a radio communication system, and a radio receiving method capable of eliminating a pseudo reception error while minimizing a change in a frame format.

In a radio reception apparatus according to one aspect of the present disclosure includes:
  at least one memory configured to store instructions; and
  at least one processor configured to execute the instructions to:
    receive a frame from a radio transmission apparatus;
    determine, using the frame received from the radio transmission apparatus, whether or not transmission of a preceding frame that has been received from the radio transmission apparatus before receiving of the frame has been interrupted; and
    eliminate a reception error regarding the preceding frame in accordance with a determination that the transmission of the preceding frame has been interrupted.

A radio communication system according to one aspect of the present disclosure includes:
  a radio transmission apparatus; and
  a radio reception apparatus.

The radio transmission apparatus includes:
  at least one transmitting-side memory configured to store transmitting-side instructions; and
  at least one transmitting-side processor configured to execute the transmitting-side instructions to:
    accept an input of a frame;
    transmit the frame to a radio reception apparatus; and
    interrupt transmission of a non-priority frame in response to input of a priority frame during transmission of the non-priority frame.

The radio reception apparatus includes:
  at least one receiving-side memory configured to store receiving-side instructions; and
  at least one receiving-side processor configured to execute receiving-side instructions to:
    receive a frame from a radio transmission apparatus;
    determine whether or not transmission of a preceding frame that has been received from the radio transmission apparatus before receiving of the frame has been interrupted using the frame received from the radio transmission apparatus; and
    eliminate a reception error regarding the preceding frame in accordance with a determination that the transmission of the preceding frame has been interrupted.

A radio receiving method according to one aspect of the present disclosure includes:
  receiving a frame from a radio transmission apparatus;
  determining, using the frame received from the radio transmission apparatus, whether or not transmission of a preceding frame that has been received from the radio transmission apparatus before receiving of the frame has been interrupted; and
  eliminating a reception error regarding the preceding frame in accordance with a determination that the transmission of the preceding frame has been interrupted.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 11 is a block diagram showing one example of a configuration of a radio reception apparatus according to the third example embodiment;

FIG. 12 is a diagram for describing one example of processing of the radio reception apparatus according to the third example embodiment;

EXAMPLE EMBODIMENT

Hereinafter, the present disclosure will be described based on example embodiments of the present disclosure. However, the disclosure set forth in claims is not limited to the following example embodiments. Moreover, it is not absolutely necessary to provide all the configurations to be described in the following example embodiments as means for solving the problems. Throughout the drawings, the same symbols are attached to the same elements and overlapping descriptions are omitted as appropriate.

First Example Embodiment

Figure 1:
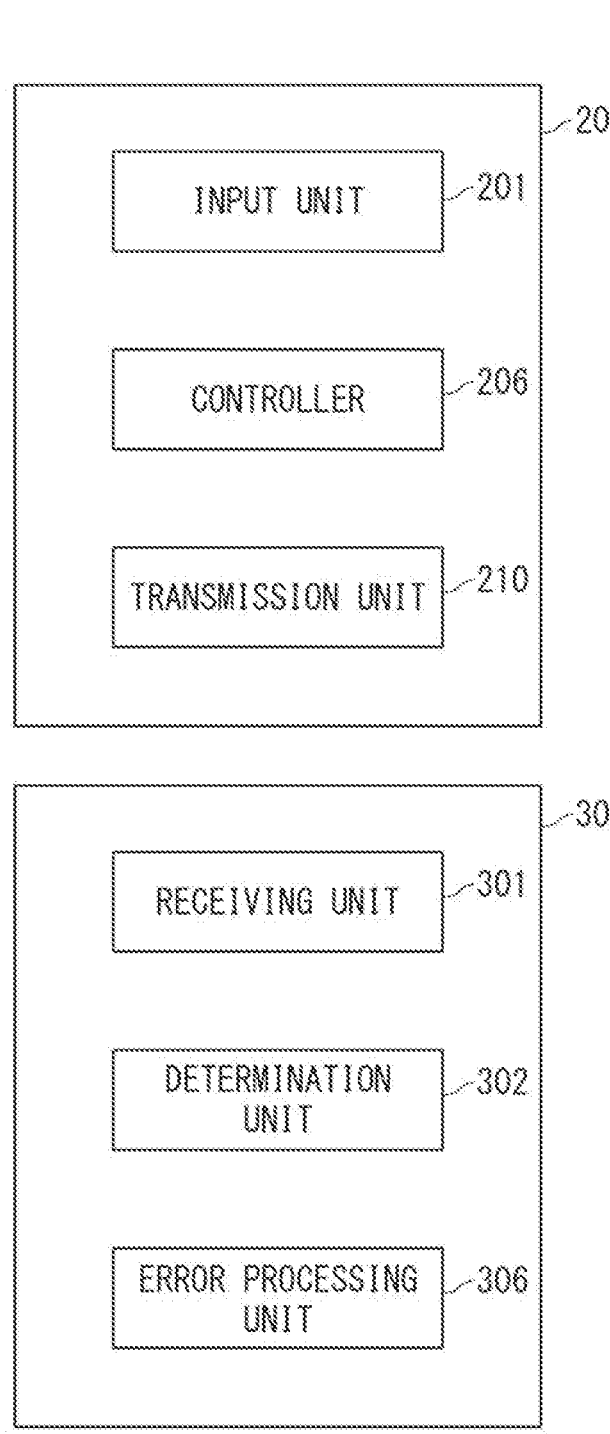
FIG. 1 is a block diagram showing a configuration of a radio communication system according to a first example embodiment.

Referring first to FIG. 1, a first example embodiment according to the present disclosure will be described. FIG. 1 is a block diagram showing a configuration of a radio communication system 1 according to the first example embodiment.

The radio communication system 1 includes a radio transmission apparatus 20 and a radio reception apparatus 30.

The radio transmission apparatus 20 includes an input unit 201, a controller 206, and a transmission unit 210.

The input unit 201 accepts input of a frame.

The controller 206 supplies the frame input by the input unit 201 to the transmission unit 210.

The transmission unit 210 transmits the frame supplied from the controller 206 to the radio reception apparatus 30.

The frame is classified as a priority frame or a non-priority frame. The controller 206 interrupts, in response to input of a priority frame during transmission of a non-priority frame, supply of the non-priority frame to the transmission unit 210, and interrupts transmission of the non-priority frame. After that, the controller 206 may add interruption information indicating that the transmission of the non-priority frame has been interrupted to the input priority frame and supply the obtained frame to the transmission unit 210.

The radio reception apparatus 30 includes a receiving unit 301, a determination unit 302, and an error processing unit 306.

The receiving unit 301 receives a frame from the radio transmission apparatus 20.

The determination unit 302 determines, using a frame received from the radio transmission apparatus 20, whether or not transmission of a preceding frame that has been received from the radio transmission apparatus 20 before receiving of the frame has been interrupted.

The error processing unit 306 eliminates a reception error regarding the preceding frame in accordance with a determination that the transmission of the preceding frame has been interrupted.

Now, a radio transmission method of the radio transmission apparatus 20 when the interruption information is added to the priority frame will be described. First, the input unit 201 accepts the input of the priority frame during the transmission of the non-priority frame. Then the controller 206 interrupts, in response to the acceptance of the input, the transmission of the non-priority frame, adds the interruption information to the priority frame, and supplies the obtained frame to the transmission unit 210. Then the transmission unit 210 transmits the priority frame to the radio reception apparatus 30.

Next, a radio receiving method of the radio reception apparatus 30 will be described. First, the receiving unit 301 receives a frame from the radio transmission apparatus 20. Then the determination unit 302 determines, using the frame received from the radio transmission apparatus 20, whether or not transmission of a preceding frame that has been received from the radio transmission apparatus before receiving of the frame has been interrupted. Then the error processing unit 306 eliminates the reception error regarding the preceding frame in accordance with a determination that the transmission of the preceding frame has been interrupted.

As described above, with the radio communication system 1 according to the first example embodiment, the radio reception apparatus 30, which is on the receiving side, determines whether or not transmission of a preceding frame has been interrupted by the radio transmission apparatus 20, which is on the transmitting side. Therefore, the radio communication system 1 is able to eliminate a pseudo reception error indicating a reception error that would be erroneously counted when transmission is intentionally interrupted on the transmitting side. Further, according to the above configuration, when the priority frame has been input during the transmission of the non-priority frame, the radio reception apparatus 30 is able to transmit the priority frame immediately after the transmission of the non-priority frame has been interrupted and the delay variation of the priority frame can be reduced.

The radio communication system 1 determines, using the frame that the receiving side has received most recently, whether or not the transmission of the frame received before the frame on the transmitting side has been interrupted. Therefore, there is no need to change or significantly change the frame format on the transmitting side.

As described above, the radio communication system 1 is able to eliminate the pseudo reception error while minimizing the change in the frame format.

Second Example Embodiment

Figure 2:
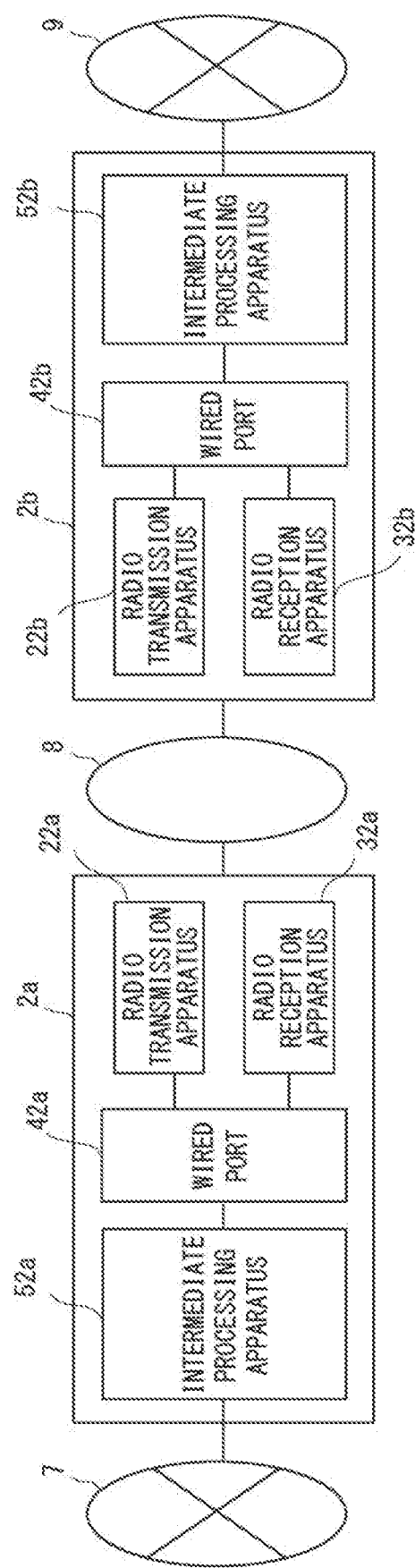
FIG. 2 is a block diagram showing one example of a system to which a radio communication apparatus according to a second example embodiment can be applied.

Referring next to FIGS. 2-9, a second example embodiment according to the present disclosure will be described. FIG. 2 is a block diagram showing one example of a system to which a radio communication system (which is hereinafter referred to as a radio communication apparatus) 2 according to the second example embodiment can be applied. The system constructs a relay line that relays two lines wirelessly. The system includes a plurality of radio communication apparatuses 2a and 2b and a relay line 8. In the following, when it is not necessary to differentiate radio communication apparatuses 2a and 2b, the radio communication apparatuses 2a and 2b may be simply referred to as a radio communication apparatus 2. While the number of radio communication apparatuses 2 included in the system is set to two for the sake of simplification of the description, the number of radio communication apparatuses 2 may be larger than two.

The relay line 8 is a relay line such as a backhaul line that relays a first line 7 and a second line 9. The first line 7 is, for example, a trunk communication network that provides communication between communication bases and the second line 9 is an access line that provides a separate connection from a communication base to a subscriber.

The radio communication apparatus 2 is a relay apparatus such as a computer that relays a frame received from a terminal apparatus (not shown) connected to the first line 7 (or the second line 9) to a terminal apparatus (not shown) connected to the second line 9 (or the first line 7) in accordance with a destination. The frame here indicates a transmission unit of data to be transmitted. The first line 7 and the second line 9 are, for example, a network that conforms to Ethernet (registered trademark) or the like. For relaying the frame, the radio communication apparatus 2 communicates with another radio communication apparatus 2 wirelessly to construct the relay line 8. The radio communication apparatus 2 transmits, for example, a frame to another radio communication apparatus 2 using radio waves such as micrometer waves or millimeter waves to construct the relay line 8. In FIG. 2, the radio communication apparatus 2a is connected to the first line 7 as well as the relay line 8 and the radio communication apparatus 2b is connected to the second line 9 as well as the relay line 8. The radio communication apparatus 2 includes a radio transmission apparatus 22, a radio reception apparatus 32, a wired port 42, and an intermediate processing apparatus 52.

The radio transmission apparatus 22 is a computer or the like that transmits a radio signal. The radio transmission apparatus 22 converts an interface (IF) data signal of the frame input from the wired port 42 into a microwave or millimeter wave signal and transmits the signal after the conversion to the radio reception apparatus 32 of another radio communication apparatus 2 via an antenna (not shown).

The radio reception apparatus 32 is a computer or the like that receives a radio signal. The radio reception apparatus 32 receives a microwave or millimeter wave signal from the radio transmission apparatus 22 of another radio communication apparatus 2 via an antenna, converts this signal into an IF data signal, and outputs the IF data signal to the wired port 42.

The wired port 42 is an input/output interface that connects the intermediate processing apparatus 52 and the radio transmission apparatus 22, or the intermediate processing apparatus 52 and the radio reception apparatus 32. The wired port 42 includes a plurality of wired input/output ports.

The intermediate processing apparatus 52 is connected to the first line 7 or the second line 9. The intermediate processing apparatus 52 receives a frame from a terminal apparatus connected to the first line 7 or the second line 9 and inputs the received frame to the radio transmission apparatus 22 as an IF data signal via the wired port 42. Further, the intermediate processing apparatus 52 transmits an IF data signal input from the radio reception apparatus 32 via the wired port 42 to a destination terminal apparatus via the first line 7 or the second line 9.

Figure 3:
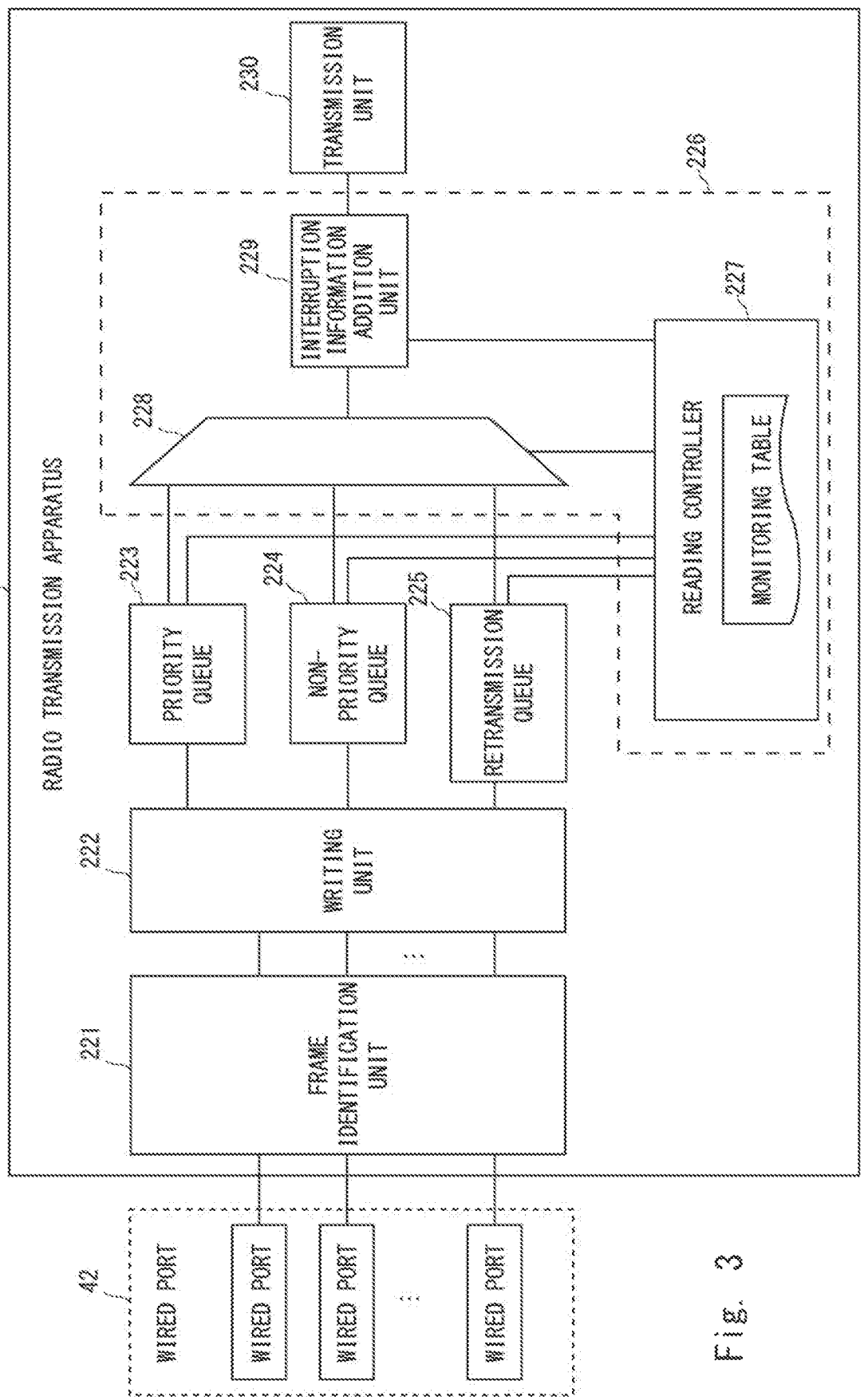
FIG. 3 is a block diagram showing one example of a configuration of a radio transmission apparatus according to the second example embodiment.
Figures 4, 5:
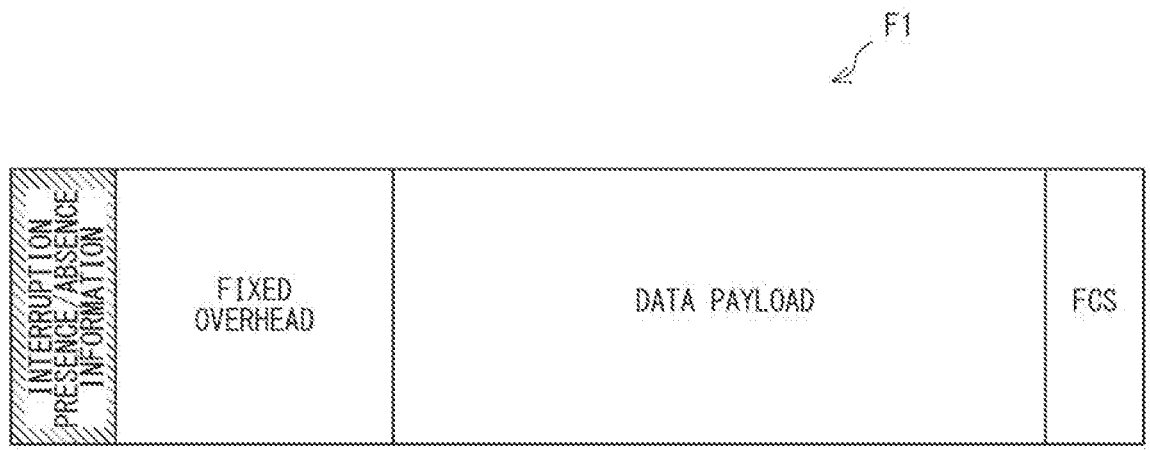
FIG. 4 is a diagram showing one example of a frame format according to the second example embodiment.
FIG. 5 is a diagram showing one example of a data structure of a monitoring table according to the second example embodiment.

Referring next to FIGS. 3 and 4, a configuration of the radio transmission apparatus 22 according to the second example embodiment will be described. FIG. 3 is a block diagram showing one example of a configuration of the radio transmission apparatus 22 according to the second example embodiment. Further, FIG. 4 is a diagram showing one example of a frame format according to the second example embodiment.

FIG. 3 shows the wired port 42 together with the radio transmission apparatus 22. The radio transmission apparatus 22 includes a frame identification unit 221, a writing unit 222, a priority queue 223, a non-priority queue 224, a retransmission queue 225, a controller 226, and a transmission unit 230.

The frame identification unit 221 accepts the input of the frame (input frame) of the IF data signal, which is to be transmitted, from the intermediate processing apparatus 52 via the wired port 42 and identifies the priority level of the input frame. That is, the frame identification unit 221 determines whether the input frame is a priority frame or a non-priority frame. The priority frame is a frame whose priority level of the transmission is higher than that of a non-priority frame. The priority frame may be a frame which is based on a communication protocol such as PTP where it is required to reduce a delay variation and the non-priority frame may be a frame based on a communication protocol other than the above communication protocol. The frame identification unit 221 supplies information on the priority level of the input frame to the writing unit 222.

The frame identification unit 221 as well as the wired port 42 function also as the input unit 201 of the radio transmission apparatus 20 according to the first example embodiment.

The writing unit 222 identifies the destination into which the input frame is to be written in accordance with the priority level of the input frame and performs writing processing. The input frame is written into the priority queue 223 or the non-priority queue 224. The priority queue 223 is a storage medium that temporarily stores the input priority frame. The non-priority queue 224 is a storage medium that temporarily stores the input non-priority frame.

That is, when the input frame is a priority frame, the writing unit 222 stores the input frame in the priority queue 223. On the other hand, when the input frame is a non-priority frame, the writing unit 222 stores the input frame in the non-priority queue 224.

Further, in response to the interruption of the transmission of the non-priority frame, the writing unit 222 stores the interrupted non-priority frame in the retransmission queue 225 upon receiving a request from the reading controller 227.

The retransmission queue 225 is a storage medium that temporarily stores the retransmission frame. The retransmission frame, which is a non-priority frame whose transmission has been interrupted due to the input of the priority frame, is a non-priority frame that is intended to be retransmitted after transmission of the priority frame.

The controller 226 reads out a frame from the queue, adds interruption presence/absence information to the frame, and supplies the obtained frame to the transmission unit 230. In this second example embodiment, the interruption presence/absence information is information indicating the presence or the absence of interruption of transmission of a preceding frame which is a frame that has been transmitted prior to the frame that has been input most recently. In the second example embodiment, the preceding frame is a previous frame that has been transmitted just before the frame that has been input most recently. Now, a frame format according to the second example embodiment will be described. As shown in FIG. 4, the frame includes interruption presence/absence information at a predetermined bit position. In this second example embodiment, the interruption presence/absence information is defined in a bit position prior to a data payload of the frame. For example, one byte of interruption presence/absence information is defined at the top bit position of the frame. That is, as shown in FIG. 4, the frame includes, in order from the top bit position, interruption presence/absence information, a fixed overhead, a data payload, and an FCS, which is an error detection code at the end of the frame.

The controller 226 includes a reading controller 227, a selector 228, and an interruption information addition unit 229.

The reading controller 227 performs various kinds of control for frame reading. For example, the reading controller 227 monitors the usage amount of the priority queue 223 and the usage amount of the non-priority queue 224 and selects a queue for reading. Then the reading controller 227 reads out frames from the respective queues and supplies the frames that have been read out to the selector 228. Further, the reading controller 227 controls selection of the frames that have been read out, the selection being performed by the selector 228. That is, the reading controller 227 reads out a frame to be read out from the selected queue via the selector 228. The reading controller 227 erases, in response to the completion of the reading of the frame to be read out from the selected queue, the frame that has been read out as appropriate from the queue for reading.

Further, the reading controller 227 causes the supply of the non-priority frame to the transmission unit 210 to be interrupted in response to the storage of the priority frame in the priority queue 223 during the transmission of the non-priority frame, that is, in response to the input of the priority frame during transmission of the non-priority frame. In this case, the reading controller 227 instructs the interruption information addition unit 229 to add interruption information indicating that the transmission of the non-priority frame has been interrupted to a priority frame that is to be supplied to the transmission unit 230 next as interruption presence/absence information. Then the reading controller 227 requests the writing unit 222 to store the interrupted non-priority frame in the retransmission queue 225.

Now the reading controller 227 executes these processes using a monitoring table that will be described later.

The selector 228 selectively supplies the supplied frame to the interruption information addition unit 229 in accordance with a selection control signal of the frame from the reading controller 227.

The interruption information addition unit 229 adds the interruption information to the frame supplied from the selector 228 as the interruption presence/absence information at a predetermined bit position of the frame and supplies the obtained frame to the transmission unit 230.

When the interruption information addition unit 229 has received an instruction notification regarding addition of the interruption information from the reading controller 227, that is, when a priority frame has been input during the transmission of the non-priority frame, the interruption information addition unit 229 adds interruption information indicating that there has been an interruption to the priority frame, which is to be transmitted, as the interruption presence/absence information. Otherwise the interruption information addition unit 229 adds information indicating that there has been no interruption to the priority frame as the interruption presence/absence information.

As described above, the controller 226 functions as the controller 206 of the radio transmission apparatus 20 according to the first example embodiment.

The transmission unit 230 transmits the frame supplied from the interruption information addition unit 229 to a radio reception apparatus 32 of another radio communication apparatus 2. That is, the transmission unit 230 functions as the transmission unit 210 of the radio transmission apparatus 20 according to the first example embodiment. The transmission unit 230 may include a converter that up-converts an IF data signal and an antenna. At this time, the transmission unit 230 may convert a frame supplied as the IF data signal into a microwave or millimeter wave signal and transmit the signal after the conversion to the radio reception apparatus 32 of another radio communication apparatus 2 via the antenna.

FIG. 5 is a diagram showing one example of a data structure of the monitoring table according to the second example embodiment. The monitoring table is managed by the reading controller 227 and is used for processing of the reading controller 227. As shown in FIG. 5, the monitoring table stores the usage amount of the priority queue 223, the usage amount of the non-priority queue 224, an interruption flag, and a retransmission flag.

The usage amount of the priority queue 223 and the usage amount of the non-priority queue 224 respectively indicate the presence or the absence of frames stored in the priority queue 223 and the non-priority queue 224. They are managed by monitoring the priority queue 223 and the non-priority queue 224 by the reading controller 227.

The interruption flag is a flag indicating that there has been an interruption in the frame transmission in the previous processing. The interruption flag indicates "1" when the transmission of a non-priority frame has been interrupted and indicates "0" when a priority frame is transmitted after the interruption.

The retransmission flag is a flag indicating that there is a frame that needs to be retransmitted. The retransmission flag indicates "1" when the transmission of the non-priority frame has been interrupted and indicates "0" when the non-priority frame has been retransmitted.

Figure 6:
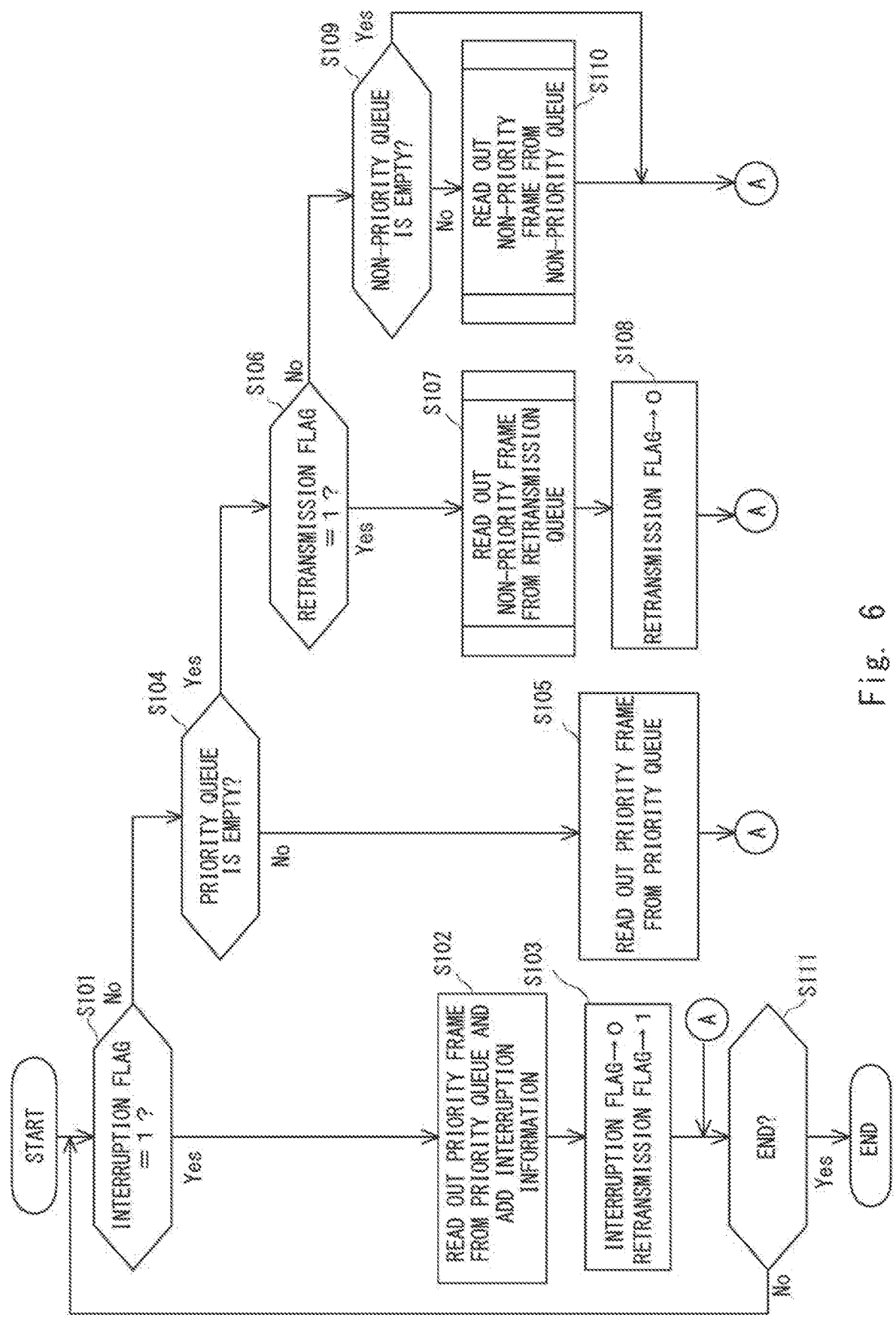
FIG. 6 is a flowchart showing one example of processing of a controller of the radio transmission apparatus according to the second example embodiment.
Figure 7:
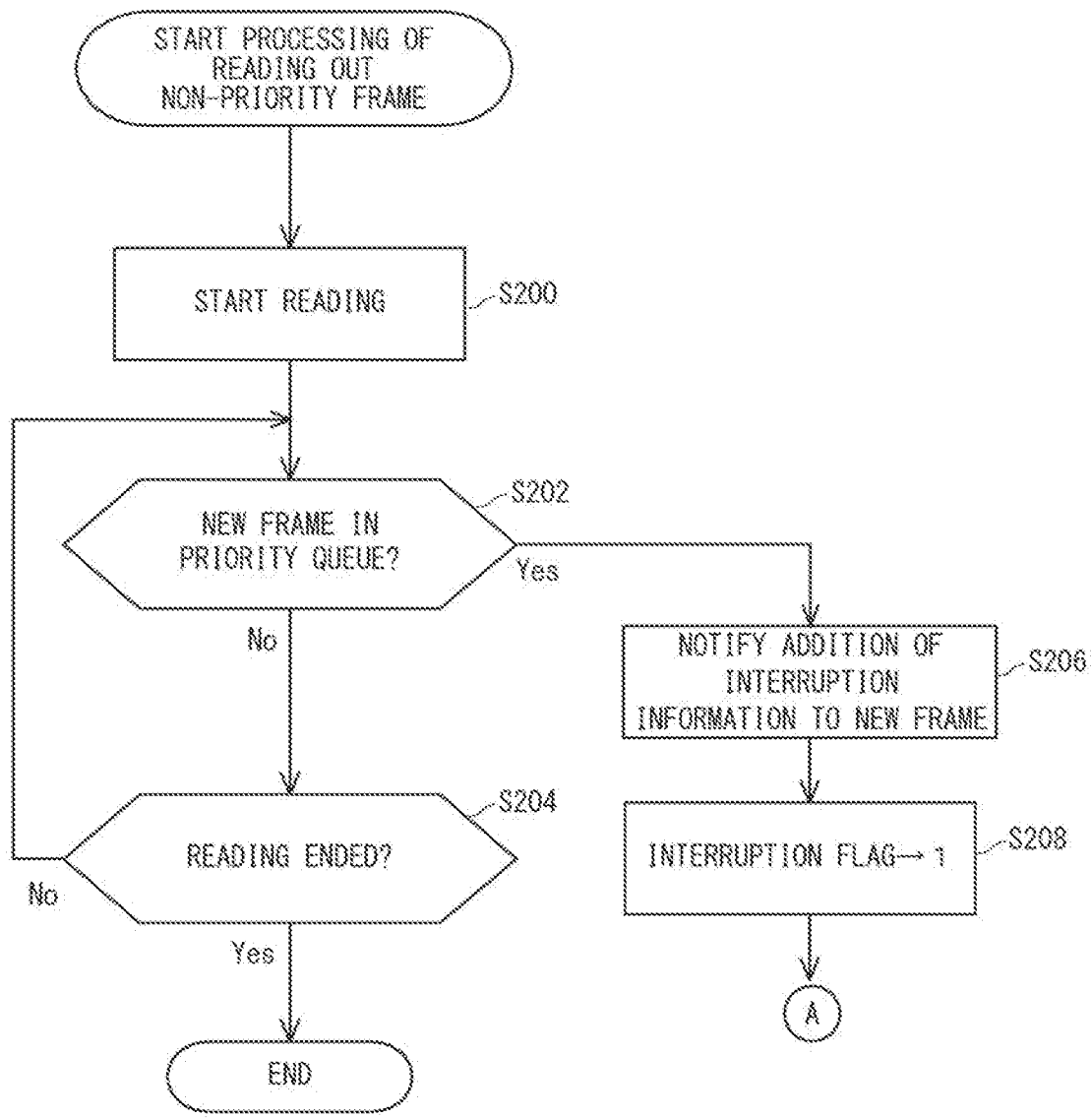
FIG. 7 is a flowchart showing one example of processing of reading out a non-priority frame of a controller of the radio transmission apparatus according to the second example embodiment.

Referring next to FIGS. 6 and 7, processing of the controller 226 of the radio transmission apparatus 22 according to the second example embodiment will be described. FIG. 6 is a flowchart showing one example of processing of the controller 226 of the radio transmission apparatus 22 according to the second example embodiment.

First, in Step S101, the reading controller 227 of the controller 226 of the radio transmission apparatus 22 determines whether or not the interruption flag of the monitoring table is "1". When the reading controller 227 determines that the interruption flag is "1" (Yes in Step S101), the reading controller 227 advances the process to Step S102. On the other hand, when the reading controller 227 determines that the interruption flag is "0" (No in Step S101), the reading controller 227 advances the process to Step S104.

Next, in Step S102, the reading controller 227 causes the supply of the non-priority frame from the interruption information addition unit 229 to the transmission unit 210 to be interrupted and reads out the priority frame from the priority queue 223 via the selector 228. Then the interruption information addition unit 229 adds information indicating that there has been an interruption to the priority frame. In this way, the radio transmission apparatus 22 transmits the priority frame in an interrupted manner.

Next, in Step S103, the reading controller 227 returns the interruption flag to "0" and sets the retransmission flag to "1". Then the reading controller 227 advances the process to Step S111.

In Step S104, in response to the interruption flag indicating "0" (No in Step S101), the reading controller 227 checks the data usage amount of the priority queue 223 and determines whether or not the priority queue 223 is empty. When it is determined that there is a frame in the priority queue 223 (No in Step S104), the reading controller 227 advances the process to Step S105. When it is determined that the priority queue 223 is empty (Yes in Step S104), the reading controller 227 advances the process to Step S106.

In Step S105, the reading controller 227 reads out the priority frame from the priority queue 223. Then the interruption information addition unit 229 adds information indicating that there has been no interruption to the priority frame. Then the reading controller 227 advances the process to Step S111.

In Step S106, in response to the priority queue 223 being empty (Yes in Step S104), the reading controller 227 determines whether or not the retransmission flag of the monitoring table is "1". When the reading controller 227 determines that the retransmission flag indicates "1" (Yes in Step S106), the reading controller 227 advances the process to Step S107. On the other hand, when the reading controller 227 determines that the retransmission flag indicates "0" (No in Step S106), the reading controller 227 advances the process to Step S109.

In Step S107, the reading controller 227 performs processing of reading out the non-priority frame from the retransmission queue 225. In this manner, the radio transmission apparatus 22 retransmits the non-priority frame whose transmission has been interrupted.

Next, in Step S108, the reading controller 227 returns the retransmission flag to "0". Then the reading controller 227 advances the process to Step S111.

In Step S109, in response to the priority queue 223 being empty and the retransmission flag indicating "0" (No in Step S106), the reading controller 227 checks the data usage amount of the non-priority queue 224 and determines whether or not the non-priority queue 224 is empty. When the reading controller 227 determines that there is a frame in the non-priority queue 224 (No in Step S109), the reading controller 227 advances the process to Step S110. On the other hand, when the reading controller 227 determines that the non-priority queue 224 is empty (Yes in Step S109), the reading controller 227 advances the process to Step S111.

In Step S110, the reading controller 227 performs processing of reading out the non-priority frame from the non-priority queue 224. Then the reading controller 227 advances the process to Step S111.

Then, in Step S111, the reading controller 227 determines whether or not to end a series of processing. A case in which the series of processing is ended is, for example, a case in which the construction of the relay line 8 is ended. When the reading controller 227 determines that the series of processing is ended (Yes in Step S111), the reading controller 227 ends the processing. Otherwise (No in Step S111), the reading controller 227 advances the process to Step S101.

FIG. 7 is a flowchart showing one example of processing of reading out the non-priority frame of the controller 226 of the radio transmission apparatus 22 according to the second example embodiment (i.e., the processing shown in Steps S107 and S110 in FIG. 6).

First, in Step S200, the reading controller 227 starts reading the non-priority frame. In the processing shown in Step S107 in FIG. 6, the reading controller 227 reads the non-priority frame from the retransmission queue 225. In the processing shown in Step S110 in FIG. 6, the reading controller 227 reads out the non-priority frame from the non-priority queue 224.

Next, in Step S202, the reading controller 227 monitors the data usage amount of the priority queue 223 and determines whether or not the priority frame has been newly stored in the priority queue 223. When the reading controller 227 determines that the new priority frame has been stored (Yes in Step S202), the reading controller 227 accepts the interruption processing and advances the process to Step S206. Otherwise (No in Step S202), the reading controller 227 advances the process to Step S204.

In Step S204, the reading controller 227 determines whether or not the reading of the non-priority frame should be ended since the reading has been completed. When the reading controller 227 determines that the reading should be ended (Yes in Step S204), the reading controller 227 ends the processing. In this case, the interruption information addition unit 229 adds information indicating that there has been no interruption to the non-priority frame. On the other hand, when the reading controller 227 determines that the reading should not be ended (No in Step S204), the reading controller 227 returns the process to Step S202.

In Step S206, the reading controller 227 reads out the newly stored priority frame and sends an instruction notification regarding the addition of the interruption information to the interruption information addition unit 229. Accordingly, the interruption information addition unit 229 adds the interruption information to the priority frame to be transmitted next as the interruption presence/absence information in Step S102 shown in FIG. 6.

Next, in Step S208, the reading controller 227 sets the interruption flag to "1" to advance the process to Step S111 shown in FIG. 6.

As described above, with the radio transmission apparatus 20 according to the second example embodiment, in response to input of a priority frame during transmission of the non-priority frame, the interruption information is added to the interruption presence/absence information defined in a bit position which is prior to a data payload of the priority frame. Therefore, it is possible to notify the radio reception apparatus 32 of the interruption of transmission of the previous frame using a frame that is to be transmitted next while maintaining a frame format in which, for example, an FCS is added to the end of the frame as much as possible.

Figure 8:
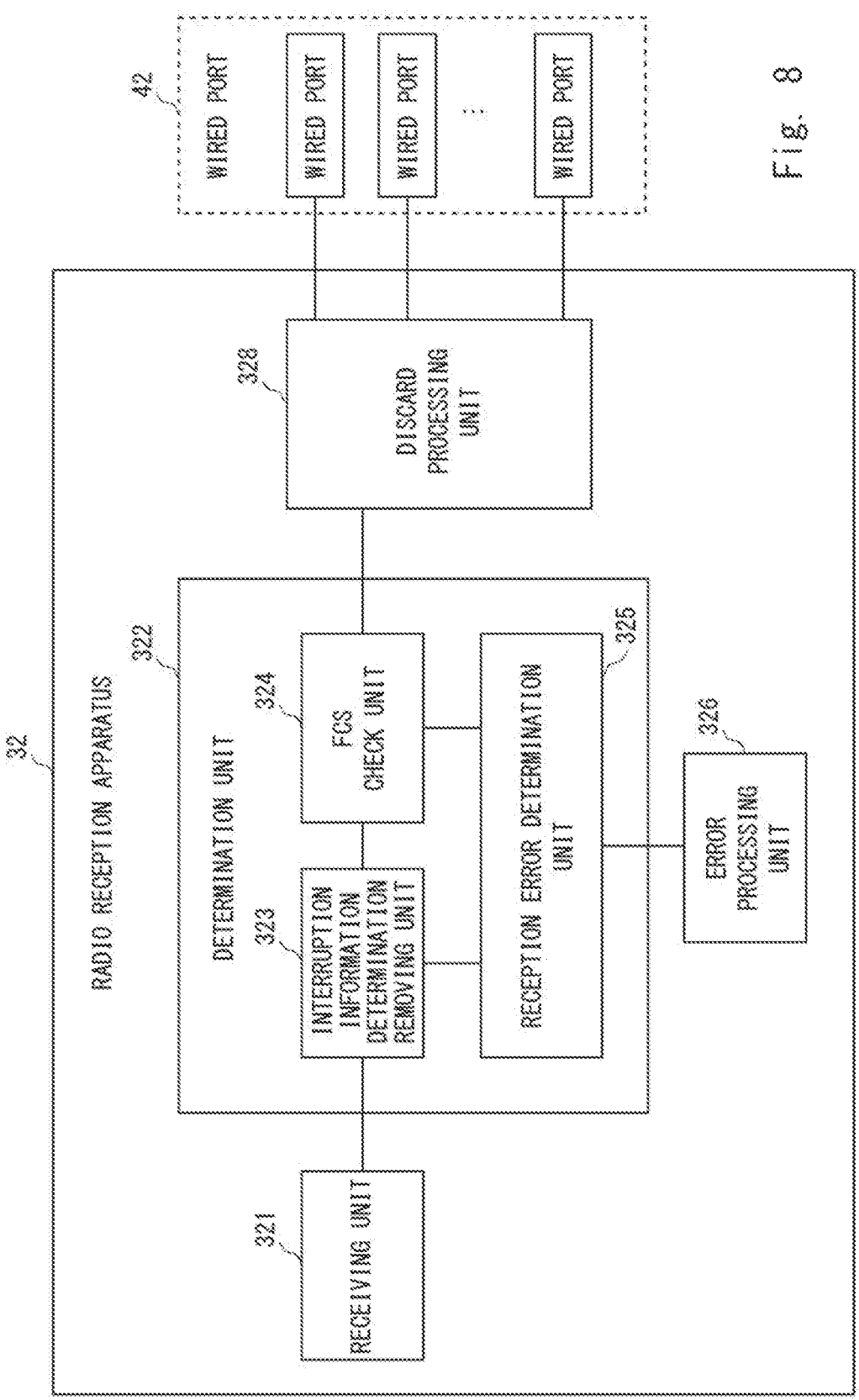
FIG. 8 is a block diagram showing one example of a configuration of a radio reception apparatus according to the second example embodiment.

FIG. 8 is a block diagram showing one example of a configuration of the radio reception apparatus 32 according to the second example embodiment. FIG. 8 shows a wired port 42 along with the radio reception apparatus 32. The radio reception apparatus 32 includes a receiving unit 321, a determination unit 322, an error processing unit 326, and a discard processing unit 328.

The receiving unit 321 receives a frame from the radio transmission apparatus 22 of another radio communication apparatus 2. That is, the receiving unit 321 functions as the receiving unit 301 of the radio reception apparatus 30 according to the first example embodiment. The receiving unit 321 may include an antenna and a converter that down-converts micrometer waves or millimeter waves. In this case, the receiving unit 321 may convert a microwave or millimeter wave signal received via the antenna into an IF data signal. Then the receiving unit 321 supplies the received frame to the determination unit 322 as an IF data signal.

The determination unit 322 determines whether or not the current frame includes information indicating that the transmission of the preceding frame has been interrupted, that is, interruption information, as interruption presence/absence information. The current frame is a received frame that has been received from the radio transmission apparatus 22 of another radio communication apparatus 2 most recently. Further, the preceding frame is a frame received before the current frame from the radio transmission apparatus 22. In this second example embodiment, the preceding frame is a previous frame that has been received just before the current frame. Accordingly, the determination unit 322 determines whether or not the transmission of the previous frame has been interrupted on the transmitting side. That is, the determination unit 322 functions as the determination unit 302 of the radio reception apparatus 30 according to the first example embodiment. The determination unit 322 includes an interruption information determination removing unit 323, an FCS check unit 324, and a reception error determination unit 325.

The interruption information determination removing unit 323 extracts the interruption presence/absence information from the received frame and determines whether or not the interruption presence/absence information includes interruption information. In the second example embodiment, the interruption information determination removing unit 323 extracts interruption presence/absence information added to the top of the received frame for one byte. Then the interruption information determination removing unit 323 supplies the result of the determination to the reception error determination unit 325. Further, the interruption information determination removing unit 323 removes the interruption presence/absence information from the received frame and supplies the received frame obtained by the removal to the FCS check unit 324.

The FCS check unit 324 performs error detection (FCS check) that uses the FCS on the received frame from which the interruption presence/absence information has been removed. When the interruption information is included in the received frame as the interruption presence/absence information, the FCS check unit 324 performs the error detection on the received frame from which the interruption information has been removed. The error detected by the FCS check unit 324 is referred to as an FCS error. In the second example embodiment, when the FCS error has been detected, a reception error which has not yet been confirmed regarding this reception is counted regarding this reception. The FCS check unit 324 supplies the result of the detection to the reception error determination unit 325 and the discard processing unit 328 and supplies the received frame from which the interruption presence/absence information has been removed to the discard processing unit 328.

The reception error determination unit 325 controls the interruption information determination removing unit 323 and the FCS check unit 324 and determines whether to confirm or mask (eliminate) the reception error regarding the previous frame based on the result of the determination in the interruption information determination removing unit 323 and the result of the detection in the FCS check unit 324. The reception error determination unit 325 manages an error flag and executes the above control and determination processing based on the error flag. The error flag, which is internal status information indicating that the previous frame has been an FCS error, means whether or not the reception error which has not yet been confirmed regarding the previous frame has been detected.

The error processing unit 326 notifies an external device of the reception error regarding the previous frame in accordance with a determination made by the reception error determination unit 325 that the reception error should be confirmed. On the other hand, the error processing unit 326 masks the reception error regarding the previous frame and interrupts the notification of the reception error in accordance with a determination that the reception error should be masked. That is, the error processing unit 326 functions as the error processing unit 306 of the radio reception apparatus 30 according to the first example embodiment.

The discard processing unit 328 determines whether or not to discard the received frame that has been supplied based on the result of the detection of the FCS check unit 324. When the FCS error has been detected in the received frame, the discard processing unit 328 discards the received frame. Otherwise, the discard processing unit 328 sends the received frame to the wired port 42.

Figure 9:
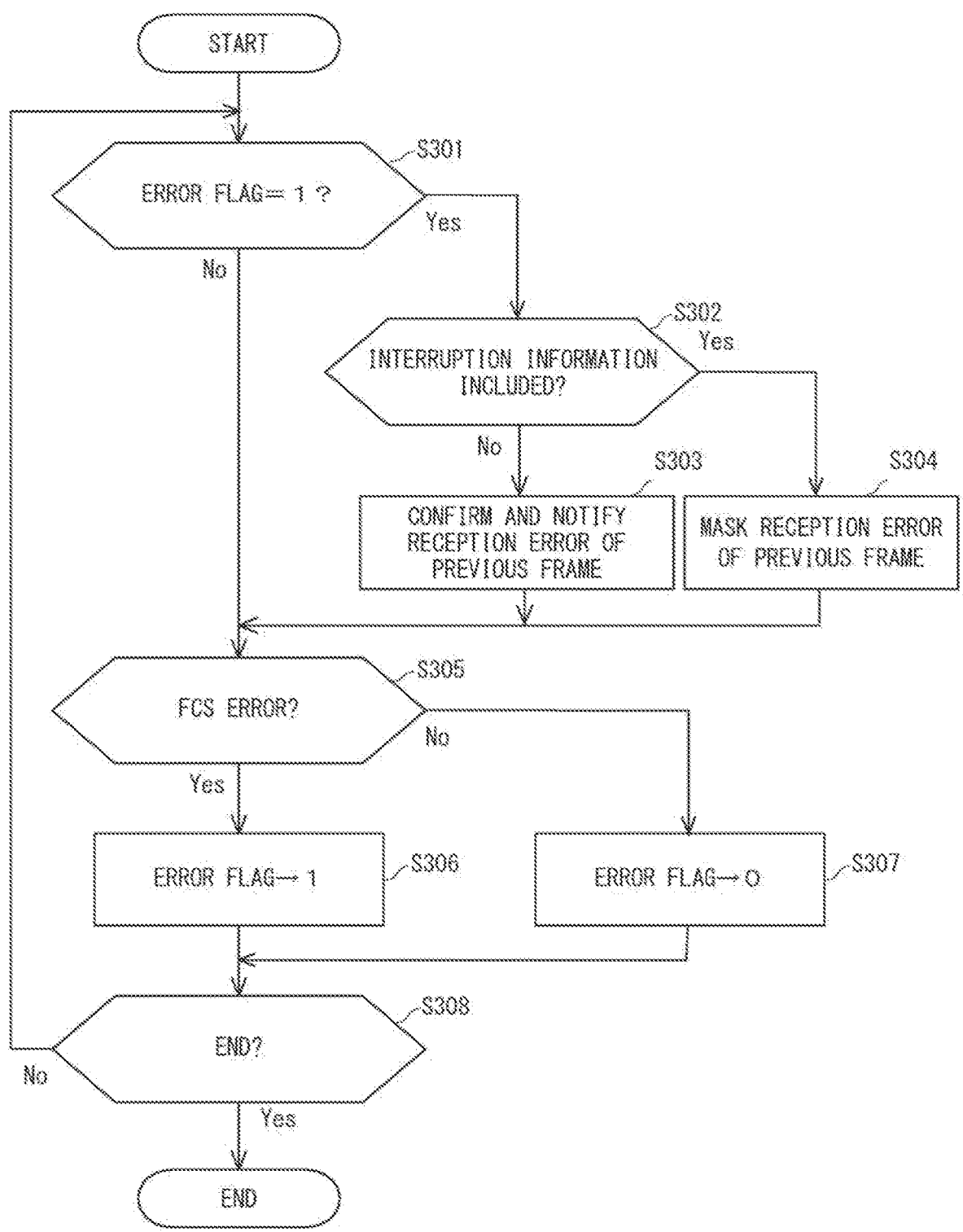
FIG. 9 is a flowchart showing one example of processing of a determination unit of the radio reception apparatus according to the second example embodiment.

FIG. 9 is a flowchart showing one example of processing of the determination unit 322 of the radio reception apparatus 32 according to the second example embodiment.

First, in Step S301, the reception error determination unit 325 of the determination unit 322 of the radio reception apparatus 32 determines whether or not the error flag indicates "1". When the error flag indicates "1" (Yes in Step S301), the reception error determination unit 325 advances the process to Step S302. Otherwise (No in Step S301), the reception error determination unit 325 advances the process to Step S305.

In Step S302, in response to the error flag indicating "1" (Yes in Step S301), the reception error determination unit 325 causes the interruption information determination removing unit 323 to determine whether or not the interruption presence/absence information of the received frame includes the interruption information. When the reception error determination unit 325 receives the result of the determination indicating that the interruption presence/absence information of the received frame includes the interruption information (Yes in Step S302), the reception error determination unit 325 advances the process to Step S304. Otherwise (No in Step S302), the reception error determination unit 325 advances the process to Step S303. Note that the interruption information determination removing unit 323 supplies the received frame from which the interruption presence/absence information has been removed to the FCS check unit 324.

In Step S303, the reception error determination unit 325 masks the reception error regarding the previous frame. That is, the error processing unit 326 stops the notification regarding the reception error regarding the previous frame.

In Step S304, the reception error determination unit 325 confirms the reception error regarding the previous frame and causes the error processing unit 326 to send a reception error. Then the reception error determination unit 325 advances the process to Step S305.

In Step S305, the reception error determination unit 325 causes the FCS check unit 324 to perform FCS check regarding the received frame from which the interruption presence/absence information has been removed, and determines whether or not the FCS error has been detected. When it is determined that the FCS error has been detected (Yes in Step S305), the reception error determination unit 325 advances the process to Step S306. Otherwise (No in Step S305), the reception error determination unit 325 advances the process to Step S307.

In Step S306, in response to the detection of the FCS error (Yes in Step S305), the reception error determination unit 325 sets the error flag to "1". Then the reception error determination unit 325 advances the process to Step S308.

In Step S307, in response to the FCS error not being detected (No in Step S305), the reception error determination unit 325 maintains the error flag at "0". Then the reception error determination unit 325 advances the process to Step S308.

In Step S308, the reception error determination unit 325 determines whether or not to end a series of processing. The case in which the series of processing is ended is, for example, a case in which the construction of the relay line 8 is ended. When the series of processing is ended (Yes in Step S308), the reception error determination unit 325 ends the processing. Otherwise (No in Step S308), the reception error determination unit 325 returns the process to Step S301.

As described above, the radio reception apparatus 32 according to the second example embodiment determines whether or not to interrupt the transmission of the previous frame on the transmitting side using interruption presence/absence information of the current frame that has been received most recently. Therefore, the radio reception apparatus 32 is able to eliminate a pseudo reception error that would be erroneously counted when the transmission is intentionally interrupted on the transmitting side. Further, according to the above procedure, even when a priority frame is input during transmission of a non-priority frame, the radio transmission apparatus 22, which is on the transmitting side, is able to transmit the priority frame immediately after the transmission of the non-priority frame has been interrupted, whereby it is possible to reduce a delay variation of the priority frame. There is no need to dramatically change the frame format on the transmitting side.

Further, the radio reception apparatus 32 confirms the reception error of the previous frame based on the results of the FCS check regarding a frame obtained by removing the interruption presence/absence information from the previous frame in addition to the interruption presence/absence information of the current frame. Accordingly, the radio reception apparatus 32 is able to correctly notify the true reception error.

As described above, the radio communication apparatus 2 according to the second example embodiment is able to eliminate the pseudo reception error while minimizing the change in the frame format.

Third Example Embodiment

Figure 10A:
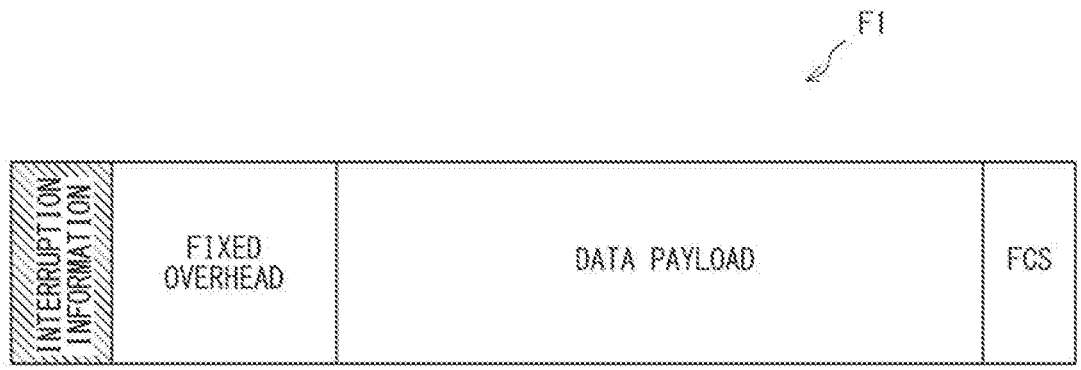
FIG. 10A is a diagram showing one example of a frame format according to a third example embodiment.
Figure 10B:
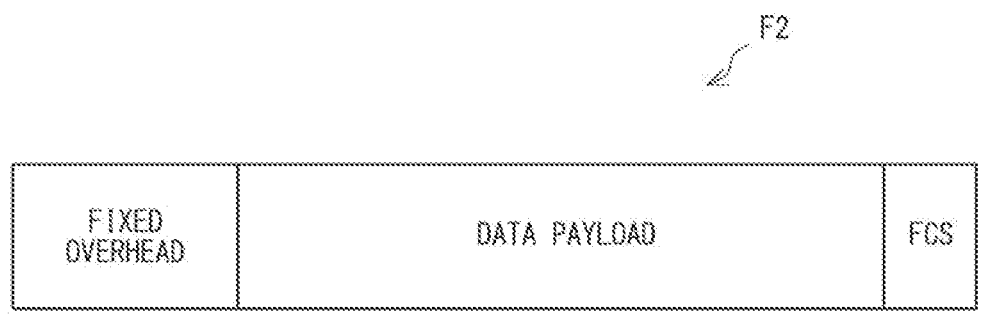
FIG. 10B is a diagram showing one example of a frame format according to a third example embodiment.

Referring next to FIGS. 10-12, a third example embodiment according to the present disclosure will be described. While a radio transmission apparatus 22 according to the third example embodiment has a configuration similar to that of the radio transmission apparatus 22 according to the second example embodiment, they are different from each other in that the radio transmission apparatus 22 according to the third example embodiment changes the frame format on demand. FIGS. 10A and 10B are diagrams showing one example of the frame format according to the third example embodiment. When a priority frame has been input during transmission of a non-priority frame, as shown in FIG. 10A, the interruption information addition unit 229 of the controller 226 of the radio transmission apparatus 22 according to the third example embodiment adds the interruption information to a predetermined bit position of the priority frame and supplies the obtained frame to the transmission unit 230. The case in which the priority frame has been input during the transmission of the non-priority frame corresponds to a case in which an instruction notification regarding addition of the interruption information has been received from the reading controller 227. In the third example embodiment, the interruption information addition unit 229 adds the interruption information to a bit position prior to the data payload of the frame, for example, to the position of the top one byte. On the other hand, when the interruption information addition unit 229 has not received any instruction notification regarding addition of the interruption information from the reading controller 227, as shown in FIG. 10B, the interruption information addition unit 229 supplies the frame to the transmission unit 230 without adding the interruption information. That is, when the priority frame has been input while a non-priority frame has not been transmitted, the interruption information addition unit 229 supplies the frame to the transmission unit 230 without adding the interruption information to the priority frame.

The radio reception apparatus 33 according to the third example embodiment has a configuration different from that of the radio reception apparatus 32 according to the second example embodiment. FIG. 11 is a block diagram showing one example of the configuration of the radio reception apparatus 33 according to the third example embodiment. The radio reception apparatus 33 according to the third example embodiment includes a determination unit 332 and an interruption information removing unit 339 in place of the determination unit 322. Then a first FCS check unit 333 supplies the received frame to a discard processing unit 328.

While the determination unit 332 has a function similar to that of the determination unit 322, the determination unit 332 is different from the determination unit 322 in that it includes a first FCS check unit 333, a second FCS check unit 334, and a determination processing unit 335.

The first FCS check unit 333 performs first error detection (first check) on the entire received frame. That is, the first FCS check unit 333 performs the FCS check using information on the entire received frame.

The second FCS check unit 334 performs second error detection (second check) on information obtained by removing information at a predetermined bit position from the received frame. In the third example embodiment, the second FCS check unit 334 performs the FCS check using information from which one byte of information is removed from the top of the received frame.

The first FCS check unit 333 and the second FCS check unit 334 supply the results of the detection to the determination processing unit 335.

The determination processing unit 335 determines whether to confirm or mask the reception error regarding the preceding frame by determining whether or not the interruption information is included in the current frame based on the results of the first check and the second check. In this third example embodiment, the preceding frame is a previous frame. When the reception error regarding the previous frame is confirmed, the determination processing unit 335 notifies the error processing unit 326 of the confirmation. The error processing unit 326 notifies an external device of the reception error regarding the previous frame in accordance with the notification from the determination processing unit 335.

When the determination processing unit 335 determines that the current frame includes the interruption information, the interruption information removing unit 339 removes the interruption information from the current frame supplied from the discard processing unit 328 and sends the obtained frame to the wired port 42. On the other hand, when the determination processing unit 335 determines that the current frame does not include the interruption information, the interruption information removing unit 339 directly sends the current frame supplied from the discard processing unit 328 to the wired port 42.

FIG. 12 is a diagram for describing one example of processing of the radio reception apparatus 33 according to the third example embodiment. As shown in FIG. 12, there are four possible cases in accordance with combinations of the results of the first check and the results of the second check, and the radio reception apparatus 32 executes different processing depending on the cases.

(Case 1)

Case 1 is a case in which an FCS error occurs in the first check but an FCS error does not occur in the second check, which means that the second check is normal. In this case, the determination processing unit 335 determines that the current frame is the one in which the interruption information is added to the top of the normal frame, that is, the one in which the interruption information is added.

Then the determination processing unit 335 sets the error flag to "0" and masks the reception error regarding the previous frame. Therefore, the error processing unit 326 does not notify an external device of a reception error regarding the previous frame.

Further, the interruption information removing unit 339 removes the interruption information from the current frame and sends the obtained frame to the wired port 42.

(Case 2)

Case 2 is a case in which the first check is normal and an FCS error has occurred in the second check. In this case, the determination processing unit 335 determines that the current frame is an entirely normal frame, that is, the one in which the interruption information is not added.

When the error flag indicates "0", the determination processing unit 335 does not change the error flag and continuously sets the error flag to "0". On the other hand, when the error flag indicates "1", that is, when Case 2 occurs next to Case 3, the determination processing unit 335 confirms the reception error regarding the previous frame. Therefore, the error processing unit 326 notifies an external device of a reception error regarding the previous frame based on the notification indicating the confirmation from the determination processing unit 335. Then the determination processing unit 335 sets the error flag to "0" (error flag: 1→0).

Then the discard processing unit 328 supplies the current frame to the interruption information removing unit 339 without discarding the current frame, and the interruption information removing unit 339 directly sends the current frame to the wired port 42.

(Case 3)

Case 3 is a case in which an FCS error has occurred in the first check and an FCS error has occurred also in the second check. In this case, the determination processing unit 335 cannot determine whether or not the interruption information is added to the current frame. However, the determination processing unit 335 determines that an error is included in any one of the bits in the current frame and therefore a reception error has occurred. When the error flag indicates "1", the determination processing unit 335 continuously sets the error flag to "1" (error flag: 1→1). This is a case in which Case 3 occurs in succession. In this case, the determination processing unit 335 confirms the reception error regarding the previous frame. Therefore, in this case, the error processing unit 326 may notify an external device of the reception error regarding the previous frame. On the other hand, when the error flag indicates "0", the determination processing unit 335 sets the error flag to "1" (error flag: 0→1). In this case, the determination processing unit 335 withholds confirmation of the reception error regarding the previous frame.

Then the discard processing unit 328 discards the current frame that has been supplied.

(Case 4)

Case 4 is a case in which the first check and the second check are both normal. This case cannot happen in principle.

As described above, according to the third example embodiment, by adding the interruption information only to a frame next to the frame whose transmission has been interrupted, the radio band can be used further efficiently while obtaining the effects similar to those obtained in the second example embodiment.

Fourth Example Embodiment

Referring next to FIGS. 13-17, a fourth example embodiment according to the present disclosure will be described. The fourth example embodiment is characterized in that interruption of transmission is detected on the receiving side from a relation between a preceding frame and a current frame without giving interruption information on the transmitting side.

Figure 13:
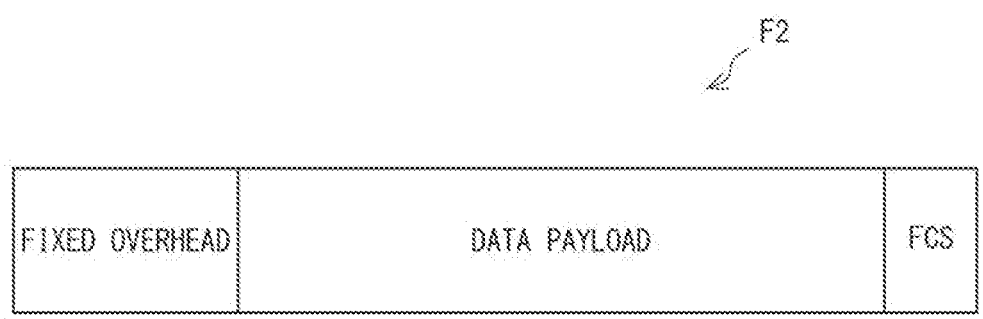
FIG. 13 is a diagram showing one example of a frame format according to a fourth example embodiment.

FIG. 13 is a diagram showing one example of the frame format according to the fourth example embodiment. As shown in FIG. 13, regardless of whether a priority frame has been input during transmission of a non-priority frame, interruption information is not added to the frame to be transmitted.

Figure 14:
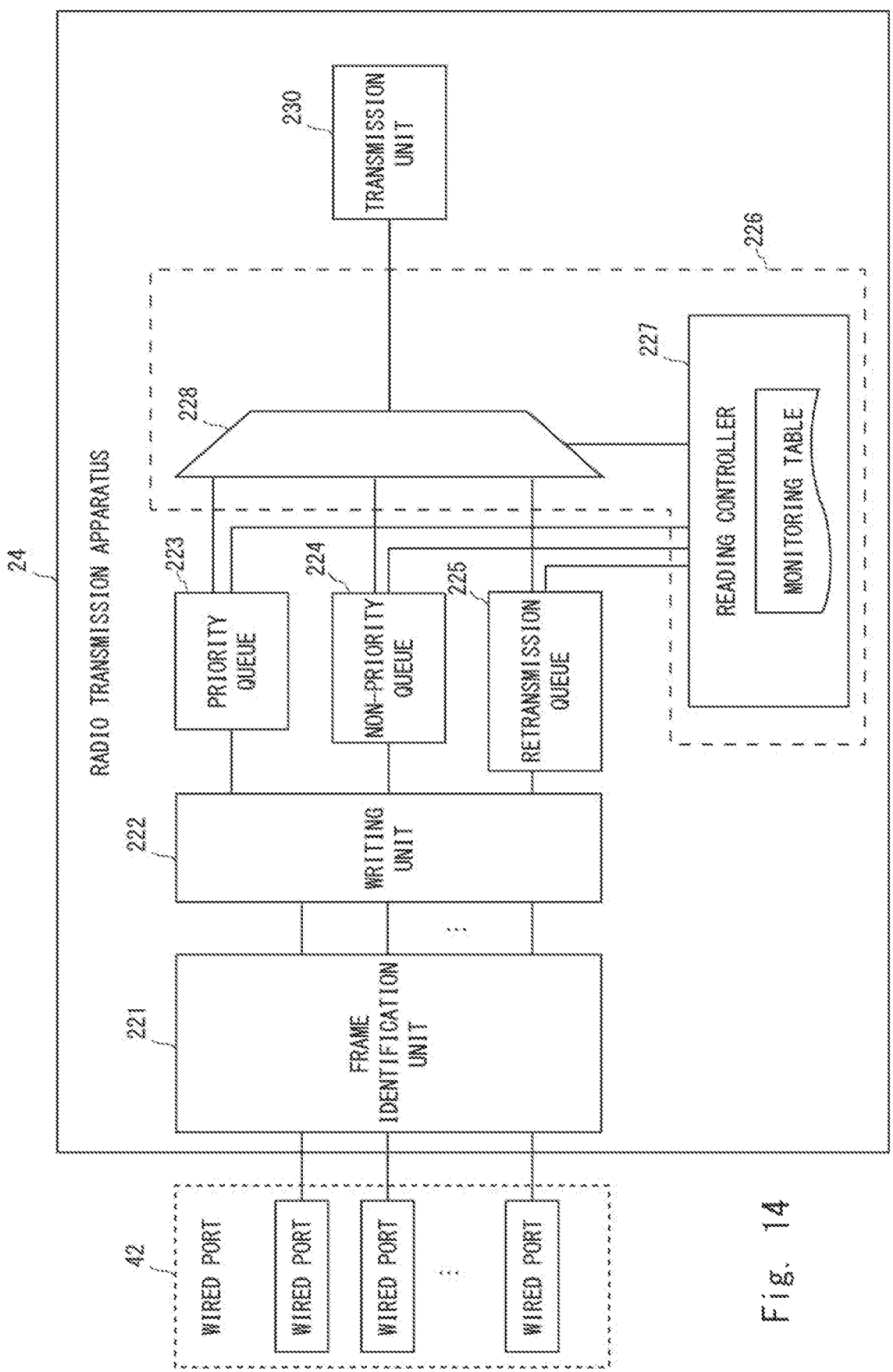
FIG. 14 is a block diagram showing one example of a configuration of a radio transmission apparatus according to the fourth example embodiment.

FIG. 14 is a block diagram showing one example of a configuration of a radio transmission apparatus 24 according to the fourth example embodiment. The radio transmission apparatus 24 according to the fourth example embodiment includes a configuration and a function that are basically similar to those of the radio transmission apparatus 22 according to the second and third example embodiments. However, the radio transmission apparatus 24 according to the fourth example embodiment is different from the radio transmission apparatus 22 according to the second and third example embodiments in that it does not include the interruption information addition unit 229.

Therefore, the reading controller 227 supplies the frame for reading to the transmission unit 230 via the selector 228.

Figure 15:
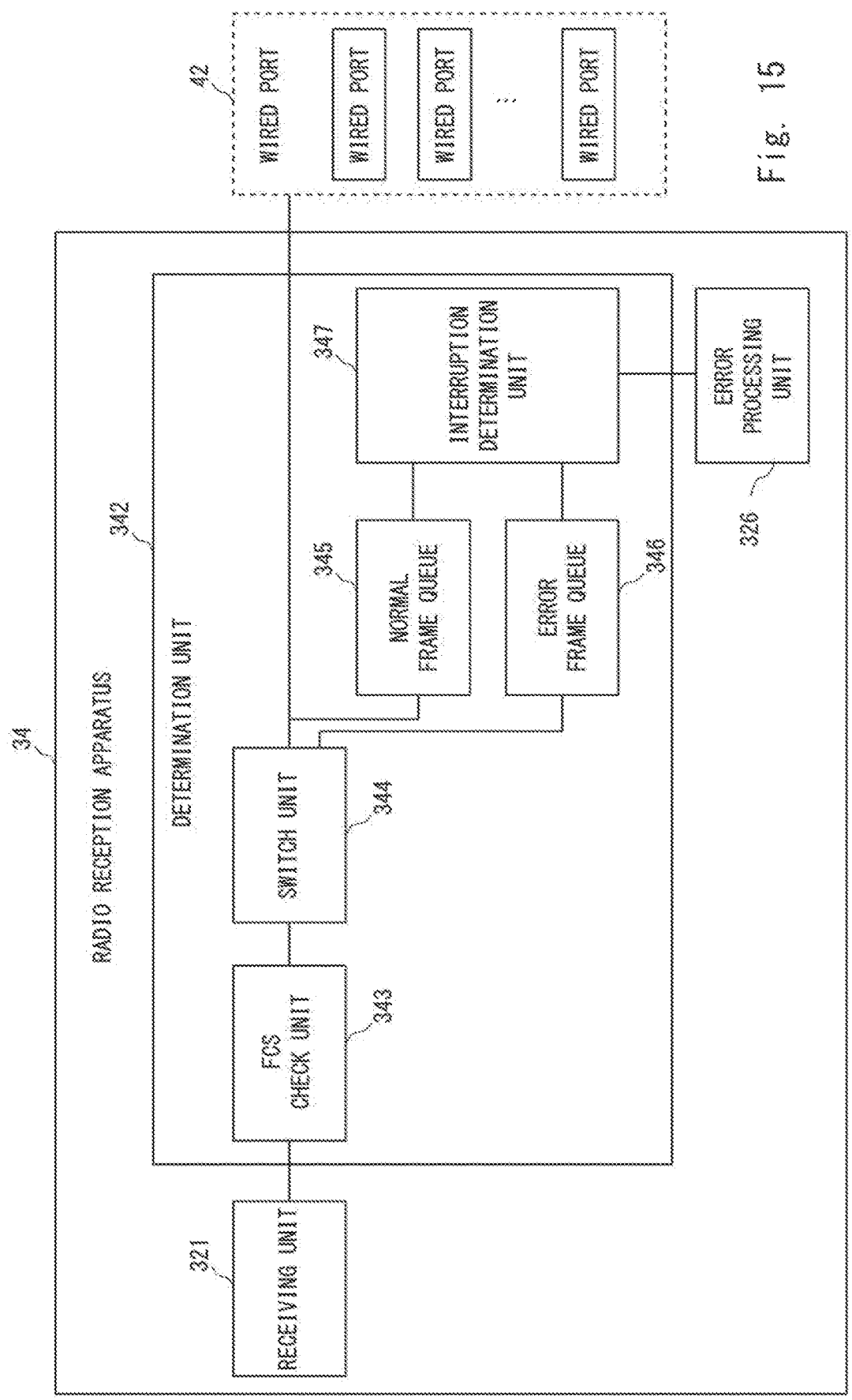
FIG. 15 is a block diagram showing one example of a configuration of a radio reception apparatus according to the fourth example embodiment.

FIG. 15 is a block diagram showing one example of a configuration of a radio reception apparatus 34 according to the fourth example embodiment. The radio reception apparatus 34 according to the fourth example embodiment includes a receiving unit 321, a determination unit 342, and an error processing unit 326. Since the receiving unit 321 and the error processing unit 326 according to the fourth example embodiment are respectively similar to the receiving unit 321 and the error processing unit 326 according to the second and third example embodiments, the descriptions thereof will be omitted.

When the current frame is a normal non-priority frame that does not include an error, the determination unit 342 determines whether or not the transmission of the preceding frame has been interrupted using the preceding frame and the current frame. The interruption frame and the retransmission frame of the interruption frame are non-priority frames, and a non-priority frame that is transmitted first after the occurrence of the interruption is a retransmission frame. Therefore, when the current frame is a retransmission frame, the preceding frame is one of the received frames received from the radio transmission apparatus 24 which is two or more frames before the current frame, the preceding frame being one received non-priority frame that is immediately before the current frame of the received non-priority frame. The determination unit 342 includes an FCS check unit 343, a switch unit 344, a normal frame queue 345, an error frame queue 346, and an interruption determination unit 347.

The FCS check unit 343 performs error detection (FCS check) that uses FCS on the received frame. The FCS check unit 343 supplies the result of the detection to the switch unit 344.

The switch unit 344 stores the received frame in the queue in accordance with the result of the detection in the FCS check unit 343. The switch unit 344 stores the non-priority frame of the frames in which an FCS error has not been detected (normal frames) in the normal frame queue 345 and stores the frame in which an FCS error has been detected (error frame) in the error frame queue 346.

When the FCS error has been detected in the preceding frame and the FCS error has not been detected in the current frame, which is a non-priority frame, the interruption determination unit 347 determines whether or not the transmission of the preceding frame has been interrupted based on the difference between information on predetermined bit positions in the preceding frame and predetermined bit positions in the current frame. Note that the interruption determination unit 347 monitors the data usage amount of the normal frame queue 345 and that of the error frame queue 346 and makes the above determination in response to storage of a non-priority frame that is next to the error frame in the normal frame queue 345.

Figure 16:
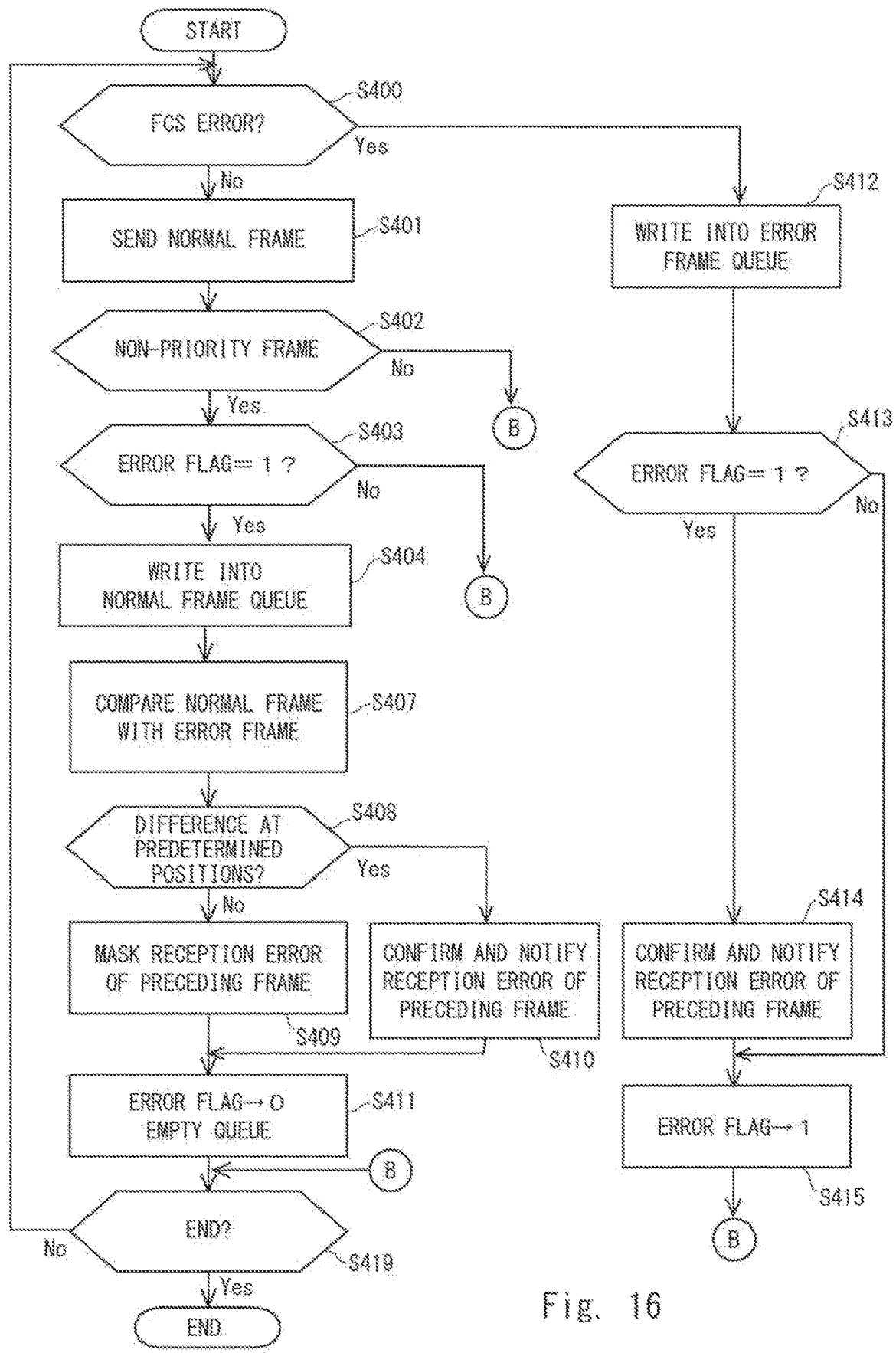
FIG. 16 is a flowchart showing one example of processing of a determination unit of the radio reception apparatus according to the fourth example embodiment.

FIG. 16 is a flowchart showing one example of processing of the determination unit 342 of the radio reception apparatus 34 according to the fourth example embodiment.

In Step S400, the switch unit 344 of the determination unit 342 receives the result of the FCS check from the FCS check unit 343 of the determination unit 342 and determines whether or not the FCS error has been detected from the received frame. When the switch unit 344 determines that the FCS error has been detected (Yes in Step S400), it moves the process to Step S412. Otherwise (No in Step S400), it moves the process to Step S401.

In Step S401, the switch unit 344 regards a frame in which the FCS error has not been detected as a normal frame and sends the normal frame to the wired port 42.

In Step S402, the switch unit 344 determines whether or not the normal frame is a non-priority frame. When the switch unit 344 determines that the normal frame is a non-priority frame (Yes in Step S402), it moves the process to Step S403. Otherwise (No in Step S402), it moves the process to Step S419.

In Step S403, the interruption determination unit 347 of the determination unit 342 determines whether or not the error flag indicates "1". When the interruption determination unit 347 determines that the error flag indicates "1" (Yes in Step S403), it moves the process to Step S404. Otherwise (No in Step S403), it moves the process to Step S419.

Then, in Step S404, the switch unit 344 writes the normal frame into the normal frame queue 345. The switch unit 344 advances the process to Step S407.

In Step S407, the interruption determination unit 347 reads out the current frame, which is a normal frame stored in the normal frame queue 345, and the preceding frame, which is an error frame stored in the error frame queue 346 and compares them. The interruption determination unit 347 compares them by the length of the error frame.

Next, in Step S408, the interruption determination unit 347 determines whether or not there is a difference between predetermined bit positions in the normal frame and predetermined bit positions in the error frame. In this fourth example embodiment, the interruption determination unit 347 determines whether or not there is a difference between any one of the bit positions of the normal frame and the error frame to be compared. When it is determined that there is no difference between them (No in Step S408), the interruption determination unit 347 advances the process to Step S409. On the other hand, when it is determined that there is a difference (Yes in Step S408), the interruption determination unit 347 advances the process to Step S410.

In Step S409, the interruption determination unit 347 masks the reception error regarding the preceding frame, which is the error frame. That is, the error processing unit 326 interrupts a notification of the reception error regarding the preceding frame, which is the error frame. The interruption determination unit 347 advances the process to Step S411.

On the other hand, in Step S410, the interruption determination unit 347 confirms the reception error regarding the preceding frame, which is the error frame. Then the error processing unit 326 notifies an external device of the reception error regarding the preceding frame. Then the interruption determination unit 347 advances the process to Step S411.

In Step S411, the interruption determination unit 347 sets the error flag to "0" to empty the normal frame queue 345 and the error frame queue 346. Then the interruption determination unit 347 advances the process to Step S419.

On the other hand, in Step S412, the switch unit 344 writes the frame in which the FCS error has been detected in the error frame queue 346. Then the switch unit 344 advances the process to Step S413.

In Step S413, the interruption determination unit 347 determines whether or not the error flag indicates "1". When it is determined that the error flag indicates "1" (Yes in Step S413), the interruption determination unit 347 advances the process to Step S414. Otherwise (No in Step S413), the interruption determination unit 347 advances the process to Step S415.

In Step S414, the interruption determination unit 347 confirms the reception error regarding the error frame, which is the preceding frame. Then the error processing unit 326 notifies an external device of the reception error regarding the preceding frame. Then the interruption determination unit 347 erases the error frame for notification from the error frame queue 346 and advances the process to Step S415.

In Step S415, the interruption determination unit 347 sets the error flag to "1". Then the interruption determination unit 347 advances the process to Step S419.

In Step S419, the interruption determination unit 347 determines whether or not to end a series of processing. When it is determined that the series of processing should be ended (Yes in Step S419), the interruption determination unit 347 ends the processing. Otherwise (No in Step S419), the interruption determination unit 347 returns the process to Step S400.

As described above, according to the fourth example embodiment, it is possible to detect that the transmission of the preceding frame has been interrupted by using the preceding frame and the current frame on the receiving side using the property that the first non-priority frame after occurrence of interruption is a retransmission frame. Therefore, there is no need to change the frame format on the transmitting side. Accordingly, it becomes possible to eliminate the pseudo reception error without impairing the radio band while obtaining the effects similar to those described in the second and third example embodiments.

In the above-described first to fourth example embodiments, a computer is composed of a computer system including a personal computer, a word processor, etc. The computer is not limited thereto and may be composed of a Local Area Network (LAN) server, a host of computer (personal computer) communications a computer system connected on the Internet, etc. Further, functions may be distributed over respective devices on the network and the entire network can constitute the computer.

While this disclosure has been described as a hardware configuration in the above-described first to fourth example embodiments, this disclosure is not limited thereto. This disclosure may provide various kinds of processing such as the transmission processing and the reception processing described above by causing a processor 1010 that will be described later to execute a computer program.

Figure 17:
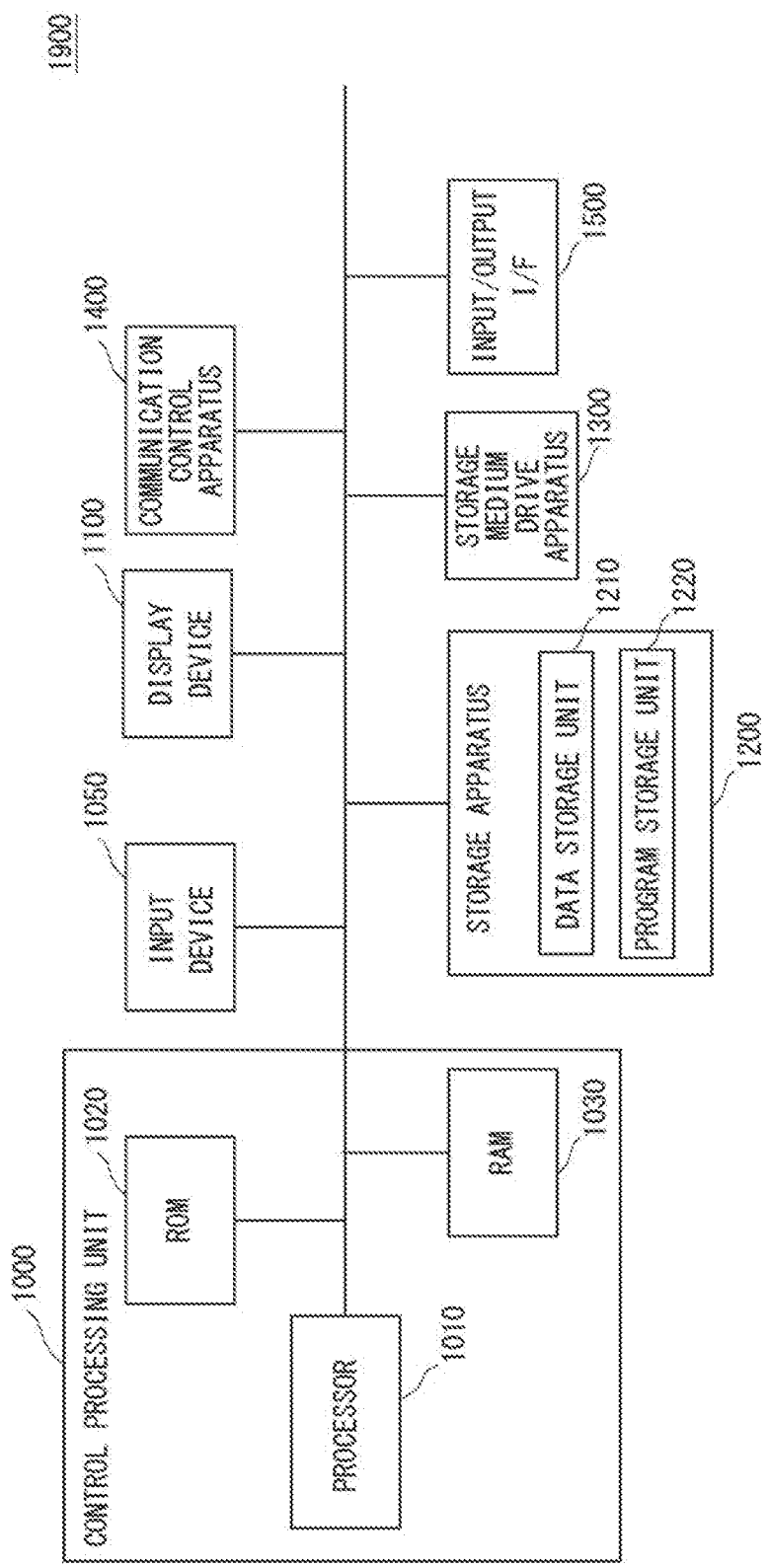
FIG. 17 is a schematic configuration diagram of a computer according to the first to fourth example embodiments.

FIG. 17 is one example of a configuration diagram of a computer 1900 according to the first to fourth example embodiments. As shown in FIG. 17, the computer 1900 includes a control processing unit 1000 for controlling the entire system. An input device 1050, a storage apparatus 1200, a storage medium drive apparatus 1300, a communication control apparatus 1400, and an input/output I/F 1500 are connected to the control processing unit 1000 via a bus line such as a data bus.

The control processing unit 1000 includes a processor 1010, a ROM 1020, and a RAM 1030.

The processor 1010 performs various information processing and control in accordance with programs stored in various storage units such as the ROM 1020 and the storage apparatus 1200.

The ROM 1020 is a read-only memory that stores, in advance, various programs and data for causing the processor 1010 to perform various kinds of control and calculations.

The RAM 1030 is a random access memory that is used by the processor 1010 as a working memory. This RAM 1030 may be provided with various areas for performing various kinds of processing according to the first to fourth example embodiments.

The input device 1050 is a device such as a keyboard, a mouse, and a touch panel that accepts input from a user. Various keys such as a numeric keypad, a function key for executing various functions, a cursor key and the like are, for example, arranged in the keyboard. The mouse, which is a pointing device, is an input device that specifies a corresponding function by clicking a key, an icon or the like displayed on a display device 1100. The touch panel, which is an input device that is provided on the surface of the display device 1100, specifies a touch position by a user that corresponds to various operation keys displayed on the screen of the display device 1100 and accepts input of an operation key displayed corresponding to the touch position.

The display device 1100 may be, for example, a CRT or a liquid crystal display. This display device is configured to display results of input by a keyboard or a mouse or image information that has been finally searched. The display device 1100 further displays an image of an operation key for performing various kinds of necessary operations from the touch panel in accordance with various functions of the computer 1900.

The storage apparatus 1200 is composed of a readable/writable storage medium and a drive apparatus for reading/writing various kinds of information such as programs and data from/into the storage medium.

While the storage medium used in the storage apparatus 1200 is mainly a hard disc etc., it may be a non-transitory computer readable medium that is used in a storage medium drive apparatus 1300 that will be described later.

The storage apparatus 1200 includes a data storage unit 1210, a program storage unit 1220, and another storage unit that is not shown (e.g., a storage unit for backing up programs and data stored in the storage apparatus 1200). The program storage unit 1220 stores programs for implementing various kinds of processing in the first to fourth example embodiments. The data storage unit 1210 stores various kinds of data of various databases in the first to fourth example embodiments.

The storage medium drive apparatus 1300 is a drive apparatus for allowing the processor 1010 to load data or the like including computer programs or documents from external storage media.

The external storage media here indicate non-transitory computer readable media storing computer programs, data and the like. The non-transitory computer readable media include various types of tangible storage media. Examples of non-transitory computer readable media include magnetic storage media (such as flexible disks, magnetic tapes, hard disk drives, etc.), optical magnetic storage media (e.g., magneto-optical disks), a CD-Read Only Memory (ROM), CD-R, CD-R/W, and semiconductor memories (such as mask ROM, Programmable ROM (PROM), Erasable PROM (EPROM), flash ROM, random access memory (RAM)). The various programs may be provided to a computer using any type of transitory computer readable media. Examples of transitory computer readable media include electric signals, optical signals, and electromagnetic waves. Transitory computer readable media can provide various programs to a computer via a wired communication line (e.g., electric wires, and optical fibers) or a wireless communication line and the storage medium drive apparatus 1300.

That is, in the computer 1900, the processor 1010 of the control processing unit 1000 loads various programs from external storage media set in the storage medium drive apparatus 1300 and stores the loaded programs in the respective parts of the storage apparatus 1200.

In order to execute various kinds of processing, the computer 1900 is configured to load a corresponding program from the storage apparatus 1200 into the RAM 1030 and thereby execute the loaded program. Alternatively, the computer 1900 is also able to directly load the program into the RAM 1030 from an external storage medium by the storage medium drive apparatus 1300, not from the storage apparatus 1200, thereby executing the loaded program. Further, in some computers, various programs and the like, which are stored in the ROM 1020 in advance, may be executed by the processor 1010. Further, the computer 1900 may download various programs and data from other storage media via a communication control apparatus 1400, thereby executing the downloaded programs or data.

The communication control apparatus 1400 is a control apparatus for connecting between the computer 1900 and various external electronic devices such as another personal computer or a word processor by a network. The communication control apparatus 1400 allows access from these various external electronic devices to the computer 1900.

The input/output I/F 1500 is an interface for connecting various input/output devices via a parallel port, a serial port, a keyboard port, a mouse port or the like.

As the processor 1010, a Central Processing Unit (CPU), a Graphics Processing Unit (GPU), a field-programmable gate array (FPGA), a digital signal processor (DSP), an application specific integrated circuit (ASIC) and the like may be used. Further, some of them may be used in parallel to each other.

Each process performed by the system and the method shown in the claims, embodiments, or diagrams can be performed in any order as long as the order is not indicated by "prior to," "before," or the like and as long as the output from a previous process is not used in a later process. Even if the process flow in the claims, embodiments, or diagrams is described using phrases such as "first" or "next", it does not necessarily mean that the process must be performed in this order.

While the present disclosure has been described above with reference to example embodiments, the present disclosure is not limited to the above-described example embodiments. Various changes can be made to the configurations and the details of the present disclosure without departing from the spirit of the present disclosure.

The whole or part of the exemplary embodiments disclosed above can be described as, but not limited to, the following supplementary notes.

(Supplementary Note)
(Supplementary Note 1)
A radio reception apparatus comprising:
a receiving unit configured to receive a frame from a radio transmission apparatus;
a determination unit configured to determine, using the frame received from the radio transmission apparatus, whether or not transmission of a preceding frame that has been received from the radio transmission apparatus before receiving of the frame has been interrupted; and an error processing unit configured to eliminate a reception error regarding the preceding frame in accordance with a determination that the transmission of the preceding frame has been interrupted.

(Supplementary Note 2)
The radio reception apparatus according to Supplementary Note 1, wherein the determination unit determines whether or not interruption information indicating that the transmission of the preceding frame of the received frame has been interrupted is included in the received frame.

(Supplementary Note 3)
The radio reception apparatus according to Supplementary Note 2, wherein
the determination unit includes an FCS check unit configured to perform error detection on a frame obtained by removing the interruption information from the received frame when the interruption information is included in the received frame, and
the error processing unit eliminates a reception error regarding the preceding frame based on the result of error detection of the preceding frame and the presence or the absence of the interruption information in the received frame.

(Supplementary Note 4)
The radio reception apparatus according to Supplementary Note 2, wherein the determination unit comprises:
a first FCS check unit configured to perform first error detection on the received frame;
a second FCS check unit configured to perform second error detection on information obtained by removing information on a predetermined bit position from the received frame; and
a determination processing unit configured to determine, based on the result of the first error detection and the result of the second error detection, whether or not the interruption information is included in the received frame.

(Supplementary Note 5)
The radio reception apparatus according to Supplementary Note 4, wherein the determination processing unit determines whether or not to confirm the reception error regarding the preceding frame of the received frame based on the result of the first error detection and the result of the second error detection.

(Supplementary Note 6)
The radio reception apparatus according to Supplementary Note 1, wherein
the determination unit comprises:
an FCS check unit configured to perform error detection on the received frame; and
an interruption determination unit configured to determine, when an error has not been detected in the received frame and an error has been detected in the preceding frame of the received frame, whether or not the transmission of the preceding frame has been interrupted based on a difference between information on a predetermined bit position in the received frame and information on the predetermined bit position in the preceding frame.

(Supplementary Note 7)
A radio transmission apparatus comprising:
an input unit configured to accept an input of a frame;
a transmission unit configured to transmit the frame to a radio reception apparatus; and
a controller configured to supply the frame to the transmission unit,
wherein the controller interrupts, in response to input of a priority frame during transmission of a non-priority frame, supply of the non-priority frame to the transmission unit, adds interruption information indicating that the transmission of the non-priority frame has been interrupted to the priority frame, and supplies the obtained frame to the transmission unit.

(Supplementary Note 8)

The radio transmission apparatus according to Supplementary Note 7, wherein the controller adds the interruption information to a bit position prior to a data payload of the priority frame.

(Supplementary Note 9)

The radio transmission apparatus according to Supplementary Note 7 or 8, wherein the controller adds, in response to input of a priority frame during transmission of the non-priority frame, the interruption information to the priority frame, and supplies the added priority frame to the transmission unit, and the controller supplies, in response to input of a priority frame when a non-priority frame has not been transmitted, the priority frame to the transmission unit without adding the interruption information to the priority frame.

(Supplementary Note 10)

A radio communication system comprising:

a radio transmission apparatus comprising an input unit configured to accept an input of a frame, a transmission unit configured to transmit the frame to a radio reception apparatus, and a controller configured to supply the frame to the transmission unit and interrupt transmission of a non-priority frame in response to input of a priority frame during transmission of the non-priority frame; and a radio reception apparatus comprising a receiving unit configured to receive a frame from a radio transmission apparatus, a determination unit configured to determine, using the frame received from the radio transmission apparatus, whether or not transmission of a preceding frame that has been received from the radio transmission apparatus before receiving of the frame has been interrupted, and an error processing unit configured to eliminate a reception error regarding the preceding frame in accordance with a determination that the transmission of the preceding frame has been interrupted.

(Supplementary Note 11)

The radio communication system according to Supplementary Note 10, wherein the controller of the radio transmission apparatus interrupts, in response to input of a priority frame during transmission of a non-priority frame, supply of the non-priority frame to the transmission unit, add interruption information indicating that the transmission of the non-priority frame has been interrupted to the priority frame, and supplies the obtained frame to the transmission unit, and the determination unit of the radio reception apparatus determines whether or not the interruption information is included in the received priority frame.

(Supplementary Note 12)

A radio receiving method comprising:

a reception step for receiving a frame from a radio transmission apparatus;

a determination step for determining whether or not transmission of a preceding frame that has been received from the radio transmission apparatus before receiving of the frame has been interrupted using the frame received from the radio transmission apparatus; and an error processing step for eliminating a reception error regarding the preceding frame in accordance with a determination that the transmission of the preceding frame has been interrupted.

(Supplementary Note 13)

A radio transmission method comprising:

an input step for accepting an input of a priority frame during transmission of a non-priority frame;

a control step for interrupting, in response to the acceptance of the input, the transmission of the non-priority frame, add interruption information indicating that the transmission of the non-priority frame has been interrupted to the priority frame, and supplying the obtained frame to a transmission unit; and a transmission step for transmitting the priority frame to a radio reception apparatus.

(Supplementary Note 14)

A radio reception program for causing a computer to execute:

a reception step for receiving a frame from a radio transmission apparatus;

a determination step for determining whether or not transmission of a preceding frame that has been received from the radio transmission apparatus before receiving of the frame has been interrupted using the frame received from the radio transmission apparatus; and an error processing step for eliminating a reception error regarding the preceding frame in accordance with a determination that the transmission of the preceding frame has been interrupted.

(Supplementary Note 15)

A radio transmission program for causing a computer to execute:

an input step for accepting an input of a priority frame during transmission of a non-priority frame;

a control step for interrupting, in response to the acceptance of the input, the transmission of the non-priority frame, add interruption information indicating that the transmission of the non-priority frame has been interrupted to the priority frame, and supplying the obtained frame to a transmission unit; and a transmission step for transmitting the priority frame to a radio reception apparatus.

According to the present disclosure, it is possible to provide a radio reception apparatus, a radio communication system, and a radio receiving method capable of eliminating a pseudo reception error while minimizing a change in a frame format.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

What is claimed is:

1. A radio reception apparatus comprising:
at least one memory configured to store instructions; and
at least one processor configured to execute the instructions to:
receive a first frame and a second frame from a radio transmission apparatus, the first frame received prior to the second frame;
perform error detection on the first frame and on the second frame;
in response to determining that no error has been detected in the second frame and that an error has been detected in the first frame, determine, whether or not transmission of the first frame was interrupted based on a difference between information on a predetermined bit position in the second frame and information on the predetermined bit position in the first frame; and
eliminate a reception error regarding the first frame in accordance with a determination that the transmission of the first frame was interrupted.

2. The radio reception apparatus according to claim 1, wherein the at least one processor is configured to execute the instructions to determine whether or not interruption information indicating that the transmission of the first frame has been interrupted is included in the second frame.

3. A radio communication system comprising:
a radio transmission apparatus; and
a radio reception apparatus, wherein
the radio transmission apparatus comprises:
at least one transmitting-side memory configured to store transmitting-side instructions; and
at least one transmitting-side processor configured to execute the transmitting-side instructions to:
accept an input of a first frame and a second frame;
transmit the first frame and the second frame to a radio reception apparatus; and
interrupt transmission of a non-priority frame in response to input of a priority frame during transmission of the non-priority frame,
the radio reception apparatus comprises:
at least one receiving-side memory configured to store receiving-side instructions; and
at least one receiving-side processor configured to execute the receiving-side instructions to:
receive the first frame and the second frame from the radio transmission apparatus, the first frame received prior to the second frame;
perform error detection on the first frame and on the second frame;
in response to determining that no error has been detected in the second frame and that an error has been detected in the first frame, determine whether or not transmission of the first frame was interrupted based on a difference between information on a predetermined bit position of the second frame and information on the predetermined bit position in the first frame; and
eliminate a reception error regarding the first frame in accordance with a determination that the transmission of the first frame was interrupted.

4. The radio communication system according to claim 3, wherein
the at least one transmitting-side processor is configured to execute the transmitting-side instructions to interrupt transmission of the non-priority frame to the radio reception apparatus in response to input of the priority frame during transmission of the non-priority frame, add interruption information indicating that the transmission of the non-priority frame has been interrupted to the priority frame, and transmit the priority frame to which the interrupt information has been added to the radio reception apparatus, and
the at least one receiving-side processor is configured to execute the receiving-side instructions to determine whether or not the interruption information is included in the priority frame that has been received.

5. The radio communication system according to claim 4, wherein the at least one transmitting-side processor is configured to execute the transmitting-side instructions to add the interruption information to a bit position prior to a data payload of the priority frame.

6. A radio receiving method comprising:
receiving a first frame and a second frame from a radio transmission apparatus, the first frame received prior to the second frame;
performing error detection on the first frame and on the second frame;
in response to determining that no error has been detected in the second frame and that an error has been detected in the first frame, determining, whether or not transmission of the first frame was interrupted based on a difference between information on a predetermined bit position in the second frame and information on the predetermined bit position in the first frame; and
eliminating a reception error regarding the first frame in accordance with a determination that the transmission of the first frame was interrupted.

* * * * *